(12) United States Patent
Sako et al.

(10) Patent No.: US 7,027,366 B2
(45) Date of Patent: Apr. 11, 2006

(54) RECORDING METHOD THAT RECORDS AN IDENTIFIER INDICATING THAT TWO KINDS OF AUDIO DATA ARE RECORDED

(75) Inventors: Yoichiro Sako, Tokyo (JP); Tatsuya Inokuchi, Kanagawa (JP); Shunsuke Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 589 days.

(21) Appl. No.: 10/018,585

(22) PCT Filed: Apr. 13, 2001

(86) PCT No.: PCT/JP01/03200

§ 371 (c)(1),
(2), (4) Date: Jun. 3, 2002

(87) PCT Pub. No.: WO01/80239

PCT Pub. Date: Oct. 25, 2001

(65) Prior Publication Data

US 2002/0172117 A1    Nov. 21, 2002

(30) Foreign Application Priority Data

Apr. 14, 2000  (JP) .............................. 2000-114348

(51) Int. Cl.
*G11B 7/085* (2006.01)

(52) U.S. Cl. .............................. 369/30.04; 369/47.24; 369/53.22

(58) Field of Classification Search ............. 369/30.04, 369/47.23, 47.24, 47.55, 53.2, 53.22, 53.24, 369/53.37, 53.41, 53.45, 93, 124.07
See application file for complete search history.

(56) References Cited

U.S. PATENT DOCUMENTS 5,541,905 A * 7/1996 Aramaki ................... 369/53.22
5,737,639 A * 4/1998 Ohmori ....................... 710/73
6,072,759 A * 6/2000 Maeda et al. ............. 369/59.25

FOREIGN PATENT DOCUMENTS

WO   WO 96/19807   *   6/1996

* cited by examiner

*Primary Examiner*—Paul W. Huber
(74) *Attorney, Agent, or Firm*—Jay H. Maioli

(57) ABSTRACT

A recording method of the present invention includes a first process for recording audio data consecutively in a first recording area of a recording medium and a second process for recording audio data, which have a file format having the same file contents as audio data recorded in said first recording area, in a second recording area of said recording medium, can process audio data having a consecutive recording format and audio data having a file format, and thus makes it possible to use conveniently.

8 Claims, 15 Drawing Sheets

RECORDING METHOD THAT RECORDS AN IDENTIFIER INDICATING THAT TWO KINDS OF AUDIO DATA ARE RECORDED

This application is a 371 of PCT/JP01/03200, filed Apr. 13, 2001.

TECHNICAL FIELD

The present invention relates to a method and apparatus for recording audio data in a recording medium such as an optical disc, a reproducing method and apparatus therefor, and a recording medium.

BACKGROUND ART

A CD (compact Disc) player has been used very widely, a type of which has been a stationary type, a portable type, and an on-vehicle type. It has been enjoyed widely to replay music by way of CD. As is generally known, audio PCM (Pulse Code Modulation) data are encoded in an error correcting way and recorded consecutively by record-modulating. In FIG. 1, a reference number 1 indicates CD. Data between a read-in area 2 of an inner periphery side and an readout area 3 of an outer periphery portion are encoded in an error correcting way. Audio PCM data which have been record-modulated are recorded consecutively as a recording track 5 by way of bits.

CD player performs modulating process to recording data which have been readout from CD, in accordance with record-modulation. By performing decoding process in an error correcting way, audio PCM data are reproduced, reproduced audio PCM data are D/A converted, and thus output analog audio data are obtained.

On the other hand, in recent years, it has been possible to enjoy an audio playback by a personal computer. In this case, as shown in FIG. 2, audio PCM data per 2 K bytes (2048 bytes) having a file format defined as a sector 7 are stored in a hard disc 6 of the personal computer. The audio PCM data are readout from the hard disc 6, changed to an analog signal, and then an output analog audio signal is obtained. In this case, as is generally known, each sector 7 includes a header HD, a data portion DA of 2 k bytes, and a parity Pr for error correction and modification, and the audio PCM data of 2 K bytes are inserted in the data portion DA.

At this point, in the following explanation, the audio PCM data having the file format stored in the hard disc are defined as WAV data, and a file thereof is defined as a WAV file herein.

In this way, during the present time, data (linear PCM data) having a consecutive recording format under the circumstances of handling a CD player as electric equipment for a consumer and the WAV file under the circumstances of handling the personal computer exist separately while the same music data are processed.

At this point, for the personal computer, by installing a function of the CD player, it comes to be possible to replay CD. Data having a CD format, however, are consecutive data of the audio PCM data. Thus, it is not appropriate to handle the audio PCM data by the personal computer.

For example, in the case in which the audio PCM data from CD are copied by converting the audio PCM data from CD to coding data having MP3 (MPEG1 Audio Layer III), ATRAC (Adaptive Transform Acoustic Coding), and the like, it is not possible to perform high speed process if the audio PCM data are used without any process.

At this point, when a playback signal from CD is converted to the file format having a sector structure and once copied to the hard disc, because of the file format, it comes to be possible for the playback signal to be converted to coded data as the aforementioned MP3 type, ATRAC type, and the like and copied at high speed. Further, for the personal computer, it is convenient in various points of view for the audio data to be processed as the WAV file.

On the other hand, when the audio data stored in the hard disc of the personal computer are copied to CD-R (Compact Disc-Recordable), CD-RW (Compact Disc-Rewritable), and the like, the audio data having the file format are recorded in those discs. Since the CD player cannot reproduce data having the sector structure, it comes to be impossible to reproduce the audio data from those optical discs.

In view of such a background, conventionally, in order to make real a beneficial use of the personal computer and playback music under various circumstances by way of the CD player, even if the same music data are used, it is required to create a disc, in addition to a CD, for recording the audio data having the file format. However, this is not convenient, and further the number of discs comes to be large.

Though it can be considered that the playback signal from CD is converted to have the file format having the sector structure and stored therein by being copied to the hard disc, it is not preferable to store all of audio data of the file format as amounts to 40 megabytes per a piece of music in the hard disc, if the capacity of the hard disc, which is riddled with limitation, is considered.

In this way, conventionally, linear PCM data under the circumstances of handling the CD player as electric equipment for the consumer and the WAV file under the condition of operating the personal computer have existed separately while the same music data have been processed, thus there have not been circumstances in which both types of data have been able to be processed in the same manner.

In view of the aforementioned points, the purpose of the present invention is to provide a recording method and apparatus, a reproducing method and apparatus, and a recording medium for enabling a user to handle two types of audio data having the linear PCM data format and WAV format in an easy and convenient manner.

DISCLOSURE OF THE INVENTION

The present invention is a recording method which includes a first process for recording audio data consecutively in a first recording area of a recording medium; and a second process for recording audio data, which have a file format having the same file contents as audio data being recorded in the first recording area, in a second recording area of the recording medium.

Further the present invention is a recording medium which includes the first recording area for recording consecutive audio data and the second recording area for recording the audio data having a file format of the same contents as the audio data recorded in the first recording area.

Further, the present invention is a recording method which includes the steps of: reading information on a table of contents from a recording medium; identifying whether or not the recording medium is a recording medium in which two kinds of audio data such as audio data being recorded in the first recording area and audio data being recorded in a file format in the second recording area are recorded based on readout information on the table of contents; identifying whether or not the recording medium is a medium into which no data have yet been written when it is identified that two kinds of audio data are recorded in the recording medium; and notifying whether or not the recording medium should be defined as a recording medium for recording two kinds of audio data when the recording medium is a medium into which no data have yet been written.

Further, the present invention is a recording apparatus which includes a recording head for recording in a recording medium having a first recording area in which audio data are recorded in a consecutive way and a second recording area in which audio data having a file format are recorded; a data generating unit for generating data having a file format based on input audio data; an encoder for performing an error correcting procedure to the audio data being input and data being output from the data generating unit; a modulation process unit for performing a modulating procedure to data being output from the encoder and for providing recording data to the recording head; and a selecting unit for deciding whether the audio data being input are supplied to the encoder or to the data generating unit based on a recording format being designated.

Further, the present invention is a reproducing method which includes the steps of: reading out information on a table of contents from a recording medium; identifying whether or not the recording medium is a recording medium in which two kinds of audio data, such as audio data recorded in the first recording area and audio data having a file format being recorded in a second recording area, are recorded based on information on the table of contents being readout; and starting a process of reproducing the recording medium when an indication of a reproducing start and a selecting indication of a recording format are supplied when it is identified that the recording medium is a recording medium in which two kinds of audio data are recorded.

Further, the present invention is a reproducing method which includes the steps of: reading out information on a table of contents from a recording medium; identifying whether or not the recording medium is a recording medium in which two kinds of audio data, as audio data being recorded in the first recording area and audio data having a file format being recorded in the second recording area, are recorded based on information on the table of contents being readout; and starting a process of reproducing when instructions, which selects a reproducing start and a track position, are supplied when it is identified that the recording medium is a recording medium in which two kinds of audio data are recorded.

Further, the present invention is a reproducing apparatus which includes: a reproducing head for reading out data from a recording medium; a demodulating unit for performing demodulating procedure to data being readout from the recording medium by the recording head; a decoder for performing decoding process, corresponding to an error connection procedure, to data being output from the demodulating procedure; a converting unit for converting data having the file format to audio data when data being output from the decoder are data having a file format; and a selecting unit for deciding whether data being output from the decoder are supplied to the conversion unit or not based on information on a table of contents readout from the recording medium.

Further, the present invention is a recording method which includes the steps of: reading out information for a table of contents from a recording medium; identifying whether or not the recording medium is a recording medium which has a first recording area of recording data having a first recording density and has a second recording area of recording data having a second recording density higher than the first recording density based on information of the table of contents being readout; and recording audio data consecutively in the first recording area and further audio data having a file format are recorded in the second recording area, if it is identified that the recording medium is a recording medium having the first and second recording areas.

Further, the present invention is a reproducing method which includes the steps of: reading out information on a table of contents from a recording medium; identifying whether or not the recording medium is a recording medium which has a first recording area of recording data having a first recording density and has a second recording area of recording data having a second recording density higher than the first recording density based on information of the table of contents being readout; and starting to reproduce the recording area when an instruction of a reproducing start and an instruction of selecting a recording format are supplied, if it is identified that the recording medium is a recording medium having said first and second recording areas.

BRIEF DESCRIPTION OF DRAWINGS

FIG. 6 is a part of the flowchart for explaining the second embodiment of a data recording method of the present invention.

BEST MODE FOR CARRYING OUT THE INVENTION

In the following, the embodiments of the present invention are explained with reference to drawings. For explaining the following embodiments, to record audio data using a consecutive recording format is to record audio PCM data using a CD format. Further, to record the audio data using a file format is to record audio PCM data as a sector structure by a CD-ROM (Compact Disc Read Only Memory) encoder. At this point, for recording, there are recording by way of an authoring system in a recording company, etc. and recording for personal use by a user.

[1] First Embodiment of A Data Recording Apparatus

Figure 1:
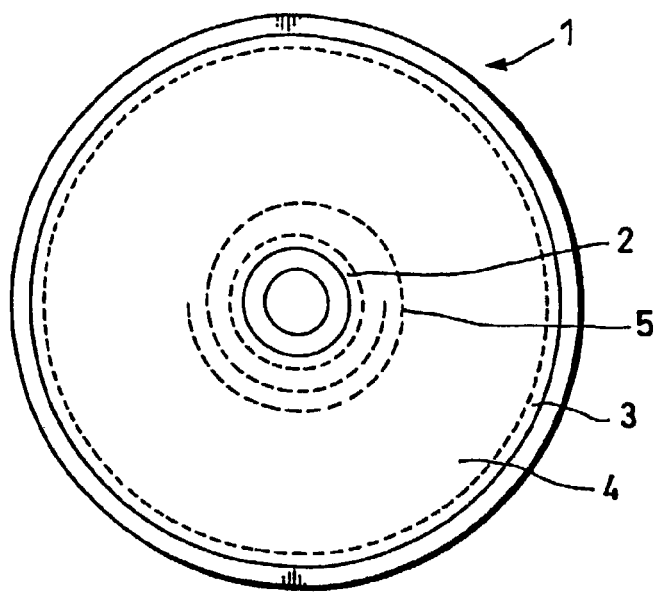
FIG. 1 is an explanatory view of a disc recording medium in which audio data having a conventional consecutive recording format are recorded.
Figure 2:
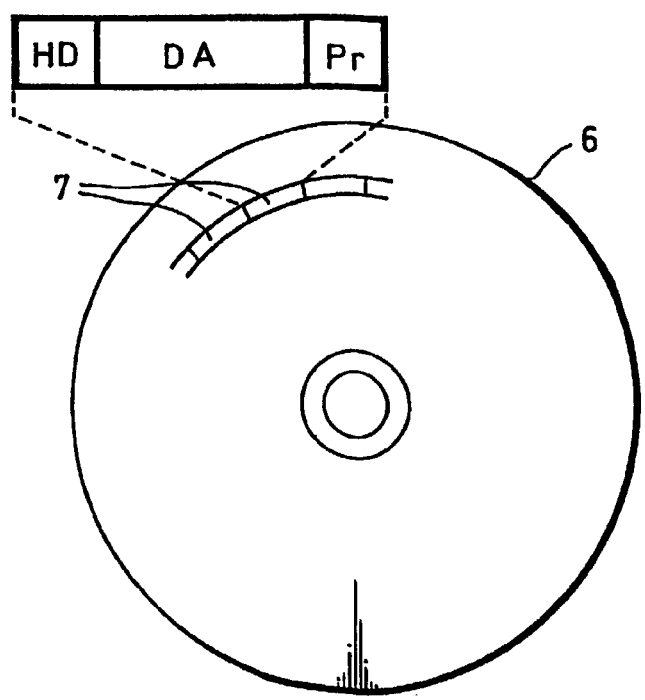
FIG. 2 is an explanatory view of a disc recording medium in which data having the conventional file format are recorded.
Figure 3:
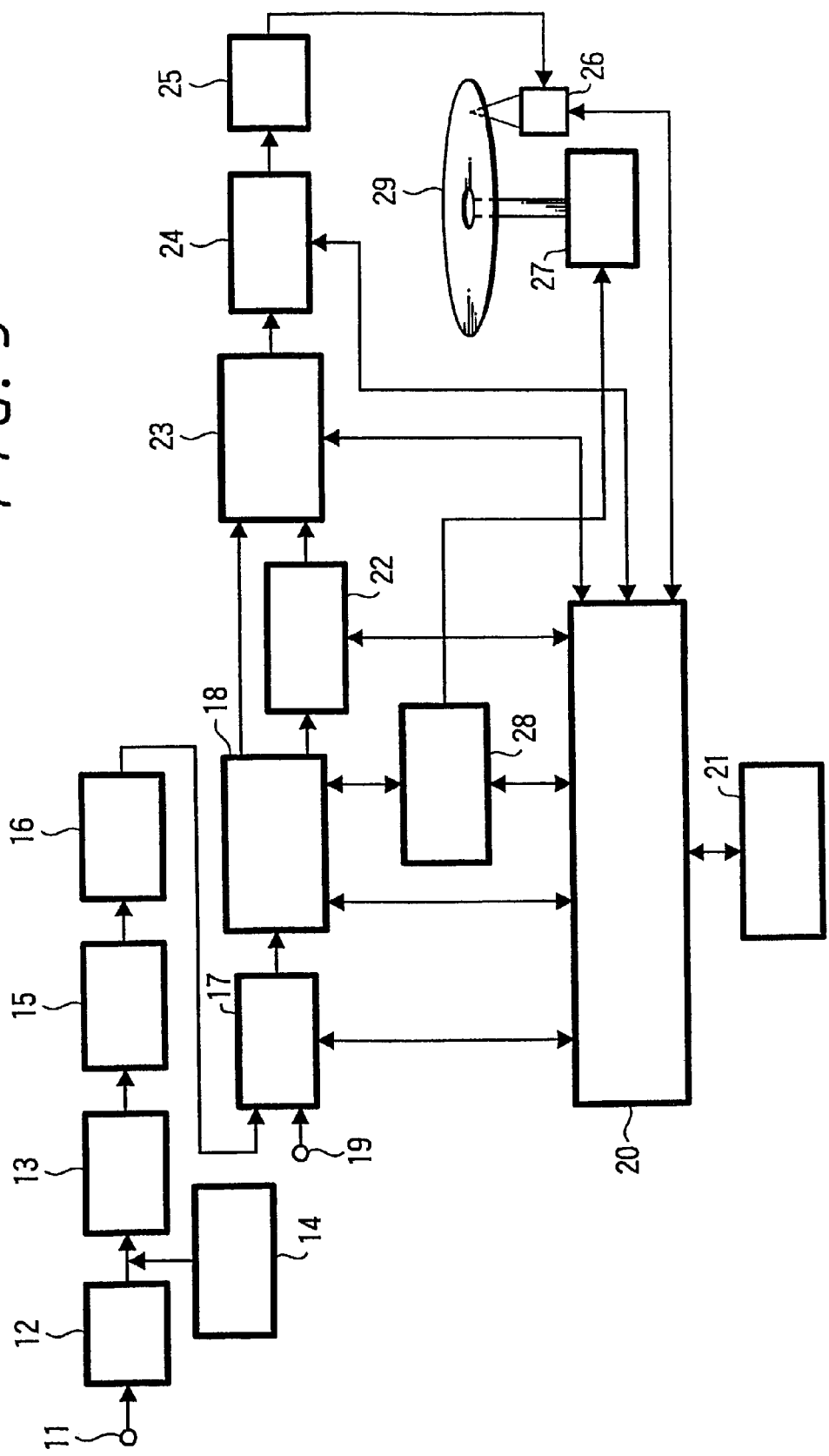
FIG. 3 is a block diagram of an embodiment of a data recording apparatus of the present invention.

FIG. 3 is a block diagram of the first embodiment of a data recording apparatus of the present invention. At this point, though the data recording apparatus of this FIG. 1 handles 2 right-and-left channel audio signals, for explaining easily, 1 system is used in FIG. 3.

In FIG. 3, an analog audio signal is supplied to a low pass filter 13 after impedance conversion is performed while it is converted to be a suitable level by being supplied to a line amplifier 12 through an input terminal 11. A dither signal from a dither generating circuit 14 is also supplied to the low pass filter 13. This dither signal is added so as to suppress high-order harmonics by a quantization noise at the time that an input signal is small.

An audio signal to which bandwidth limitation is performed by the low pass filter 13 is supplied to a sample and hold circuit 15, and it is sample-held at 44.1 kHz. The output of this sample and hold circuit 15 is supplied to an A/D converter 16, and then converted to audio PCM data of 16 bits/sample. These audio PCM data are supplied to a linear PCM/WA selector 18 by way of an input selector 17.

In the case in which the input signal is already defined as audio PCM data of 16 bit/sample, in which a sampling frequency is 44.1 Hz, the audio PCM data thereof are supplied to the input selector 17 by way of a digital signal input terminal 19.

A system controller 20 supplies an input select signal, which indicates that which data should be output from the input selector 17, to the input selector 17. The system controller 20 produces an input signal in accordance with a selecting input process through a key input unit 21 by a user.

A linear PCM/WAV selector 18 determines, in accordance with a recording form select signal from the system controller 20, any one of output terminals of 2 systems an audio PCM signal from the input selector 17 is output to.

If the select signal from the system controller 20 is a signal which indicates recording of the audio data having a sequential recording form, the linear PCM/WAV selector 18 supplies the audio PCM data to an ECC encoder 23 in a direct manner. On the other hand, if the select signal from the system controller 20 indicates recording of audio data using a file format, the selector 18 supplies them to a CD-ROM encoder 22.

This CD-ROM encoder 22 generates data having a sector structure in which sync (synchronizing signal), a header and a parity are given per 2K bytes (2048 bytes) of its input audio PCM data. The CD-ROM encoder 22 supplies the audio data having the generated sector structure to the ECC encoder 23.

In the ECC encoder 23, an error correcting encode process, which uses CIRC (Cross Interleave Reed-Solomon Code) to input data from the selector 18 or the encoder 23, is performed. The ECC encoder 23 supplies data, to which the error correcting encode process is performed, to a record modulating circuit 24.

In the record modulating circuit 24, record modulation is performed to data, to which the error correcting encode process is performed, by an EFM (Eight-to-Fourteen Modulation) method, and then the modulated data thereof are supplied to a recording head 26 by way of a recording amplifier 25. The recording head 26 records audio data on an optical disc 29 by forming pits on the optical disc 29. In such a case as a recording apparatus for a consumer, not a recording apparatus for the authoring system, the optical disc 29 having the type of changing the reflection factor of light by a light beam reflected from a recordable optical disc such as the recording head 26 is used.

The optical disc 29 is driven and rotated by a spindle motor 27. The spindle motor 27 is driven and controlled in such a way that the optical disc 29 rotates at a fixed speed by a servo-control of a constant linear speed. A speed control circuit 28 produces a speed servo signal based on an audio PCM signal from the linear PCM/WAV selector 18, and supplies it to the spindle motor 27.

This speed control circuit 28 controls to change a rotating speed of the optical disc 29 for a consecutive recording format and a file recording format in accordance with an instruction from the system controller 20.

That is to say, in the case of the consecutive recording format, audio PCM data having 2352 bytes are recorded on the optical disc 29 by every 1/75 second. On the contrary, for the file format, only audio PCM data having 2048 bytes as one sector are recorded on the optical disc 29. Thus, in the case of recording music data in real time, what is called, the same speed (onefold speed) recording, it is required that a linear speed Vf at the time of recording using the file format be faster than a linear speed Vc (1.2 m/second) for the consecutive records. In this case, the following is required:

$$Vf=Vc((2048/2352)Vc((147/128)$$

The speed control circuit 28 controls, by way of the instruction from the system controller 20, the spindle motor 27 in order for the linear speed of the optical disc 29 to attain the aforementioned Vc for the consecutive records and controls the spindle motor 27 in order for the linear speed of the optical disc 29 to attain the aforementioned Vf for the file record.

In the aforementioned structured data recording apparatus, when audio data are recorded in the consecutive recording format, by the speed control circuit 28 under control of the system controller 20, the optical disc 29 is speed-controlled in rotating in order for the linear speed Vc to become a constant at the speed of 1.2 m/second.

The audio PCM data from the linear PCM/WAV selector 18 is supplied to the ECC encoder 23 as it is by receiving a selective signal by the system controller 20. In the ECC encoder 23, an encoding procedure for correcting an error is performed to the audio PCM data from the selector 18, and the encode-processed data are supplied to the record modulating circuit 24, and then the aforementioned record modulating procedure is executed. The output data of the record modulating circuit 24 are supplied to the recording head 26 by way of the recording amplifier 25 and then recorded in the optical disc 29.

When the audio PCM data are recorded in the file format, by the speed control circuit 28 under control of the system controller 20, the rotating speed of the optical disc 29, as described in the foregoing description, is controlled in order for the linear speed Vf to become a constant at speed slightly higher than the linear speed Vc, and the rotating speed of the disc is changed.

By being selectively controlled by the system controller 20, the audio PCM data from the linear PCM/WAV selector 18 are supplied to the CD-ROM encoder 22, converted to sector structured data each having 2 K bytes, and then supplied to the ECC encoder 23. In the ECC encoder 23, an error correction encoding procedure is executed to the sector structured data from the CD-ROM encoder 22. The encoded data are supplied to the record modulating circuit 24, and then the aforementioned record modulating procedure is executed. The output data from the record modulating circuit 24 are supplied to the recording head 26 by way of the recording amplifier 25, and then recorded in the optical disc 29.

In addition, in the case of the authoring system, an optical disk which has already been recorded and created by the recording device shown in FIG. 3 is defined as a master disc, and thus the disc having the same pit patterns is created.

Using the data recording apparatus structured in this way, a recording method of the embodiment of the present invention is executed.

[2] First Embodiment of the Recording Medium and the Recording Method.

The first embodiment of the recording method of the present invention is the optical disc having the same structure as the conventional CD and CD-ROM, and the recording density thereof is the same as the conventional CD. Further, in the first embodiment of the recording method, the same music data are recorded in one optical disc using two kinds of recording forms of the consecutive recording format and the file format.

[2-1] Recording Medium

Figure 4:
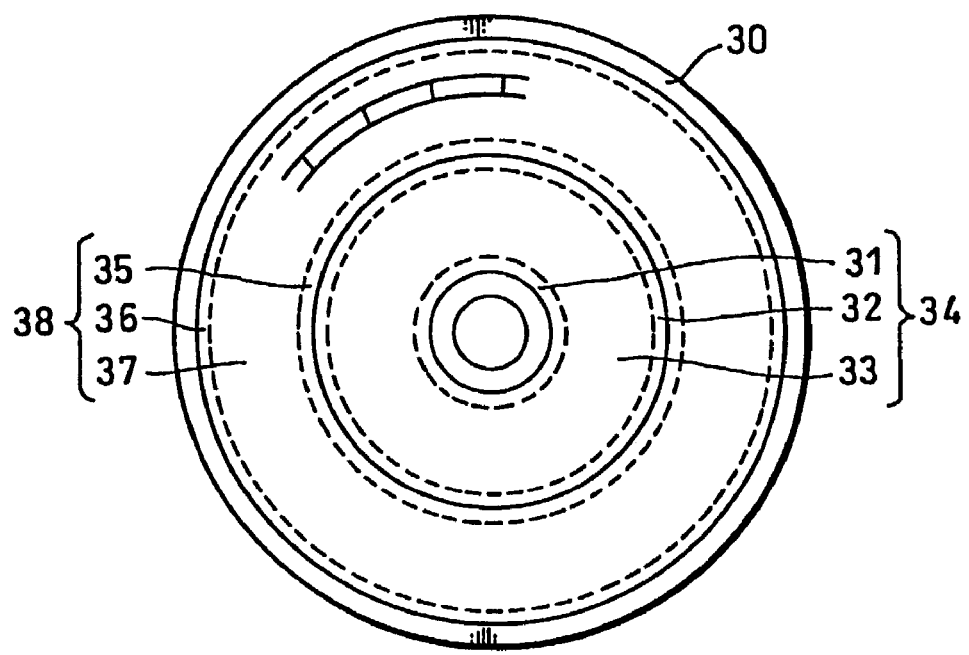
FIG. 4 is a first embodiment of the recording medium of the present invention.

FIG. 4 is a diagram of an optical disc 30 in which the audio data are recorded by the first embodiment of the recording method of the present invention.

On the side of an inner periphery of this optical disc 30, a consecutive format recording area 34 consisting of a read-in area 31, a read-out area 32, and a data area 33 is formed. On the side of an outer periphery of this optical disc 30, a file format recording area 38 consisting of a read-in area 35, a read-out area 36, and a data area 37 is formed.

In the data area 33 of the consecutive format recording area 34, in the same way as the conventional CD, the audio PCM data are encoded in an error correcting manner, and record-modulated data are recorded in a consecutive manner. Thus, the audio data of this recording area 34 are capable of being reproduced by the so-called CD player.

In the data area 37 of the file format recording area 38, the same data as the audio PCM data recorded in the consecutive format recording area 34 are structured to have the sector by the CD-ROM encoder, encoded in an error correcting manner, recorded and modulated, and then recorded. Thus, the audio data of the file format recording area 38 are capable of being reproduced by a device, such as a personal computer, which is capable of reading data having the CD-ROM format having the file format.

In this case, the consecutive format recording area 34 is arbitrary in size. Thus, the file format recording area 38 is arbitrary in position and size as well on the disc. Further, the recording density of the consecutive format recording area 34 and the recording density of the file format recording area 38 are the same.

In the read-in area 31, information on a table of contents of this optical disc 30, namely, information on TOC (Table of Contents), is recorded. It may be possible to record a part of information on TOC in the read-in area 35.

TOC information includes identifier information indicating that this disc 30 records the same audio data in two kinds of recording formats, information for identifying the position of the recording area 34 on the inner periphery side, information for identifying the position of the recording area 38 on the outer periphery side, information for indicating the recording format of the audio data recorded in the recording area 34 on the inner periphery side, information for indicating the recording format of the audio data recorded in the recording area 38 on the outer periphery side, and so forth. Information for identifying the positions of these recording areas 34 and 38 is information for indicating a start address and an end address of respective areas, for example.

In this example, information for indicating the recording format of the audio data recorded in the recording area 34 on the inner periphery side is information for indicating that the audio PCM data are recorded in a consecutive recording manner. In addition, information for indicating the recording format of the audio data recorded in the recording area 38 on the outer periphery side is information for indicating that the audio PCM data having the file format are recorded.

TOC information also includes information for identifying respective track positions of the data area 33 of the recording area 34 on the inner periphery side and information for identifying respective track positions of the data area 37 of the recording area 38 on the outer periphery side.

When the audio PCM data are recorded in the optical disc 30 only in a consecutive recording format in the same way as in the conventional CD, identifier information, which indicates that only the audio PCM data are recorded in the disc 30 instead of the identifier information which indicates that the disc 30 records the same audio PCM data using two kinds of recording formats, is recorded as TOC information. In the same way, when only audio data having the file format with the CD-ROM format are recorded in the disc 30, information for indicating the fact is recorded.

when it is decided beforehand that the audio PCM data having the consecutive recording format are to be recorded without fail in the recording area 34 of the inner periphery, information for indicating this case is not necessarily recorded in the recording area 34 on the inner periphery side. In the same way, when it is decided beforehand that the audio PCM data having the file format are to be recorded without fail in the recording area 38 on the outer periphery side, information for indicating that the audio PCM data are recorded is not necessarily recorded in the recording area 38 on the outer periphery side. At this point, it is required that the identification data for indicating that the audio PCM data are recorded in two kinds of recording formats be written as TOC information in the disc.

In accordance with the optical disc 30 of this FIG. 4, the same music data are recorded in the recording area 38 in the file format, while the same data are recorded in the recording area 34 in the same way as the CD format. Thus, it comes to be possible that the user obtains the music data having the user's favorite recording format from the disc 30.

At this point, it is possible to record the audio data having the file format in the recording area 34 on the inner periphery side and record the audio data having the consecutive recording format in the recording area 38 on the outer periphery side.

It is also possible to define the sizes and the positions of the recording area 34 and the recording area 38 in advance. In such a case, information for identifying the recording area 34 and the recording area 38 is not required, but it is needed that information for identifying the recording format of the audio data recorded in the recording area 34 and the recording area 38 is recorded. In such a case, when audio data having two kinds of recording formats are recorded in the recording area 34 and the recording area 38, the identification data having at least one kind of recording format are recorded in any one of the recording areas. For example, if identifier information for indicating that data having the file format are recorded in the record area 38 is recorded, it is understood that audio data having the consecutive recording format are recorded in the remaining recording area 34.

[2-2] Data Recording Method

Figure 5:
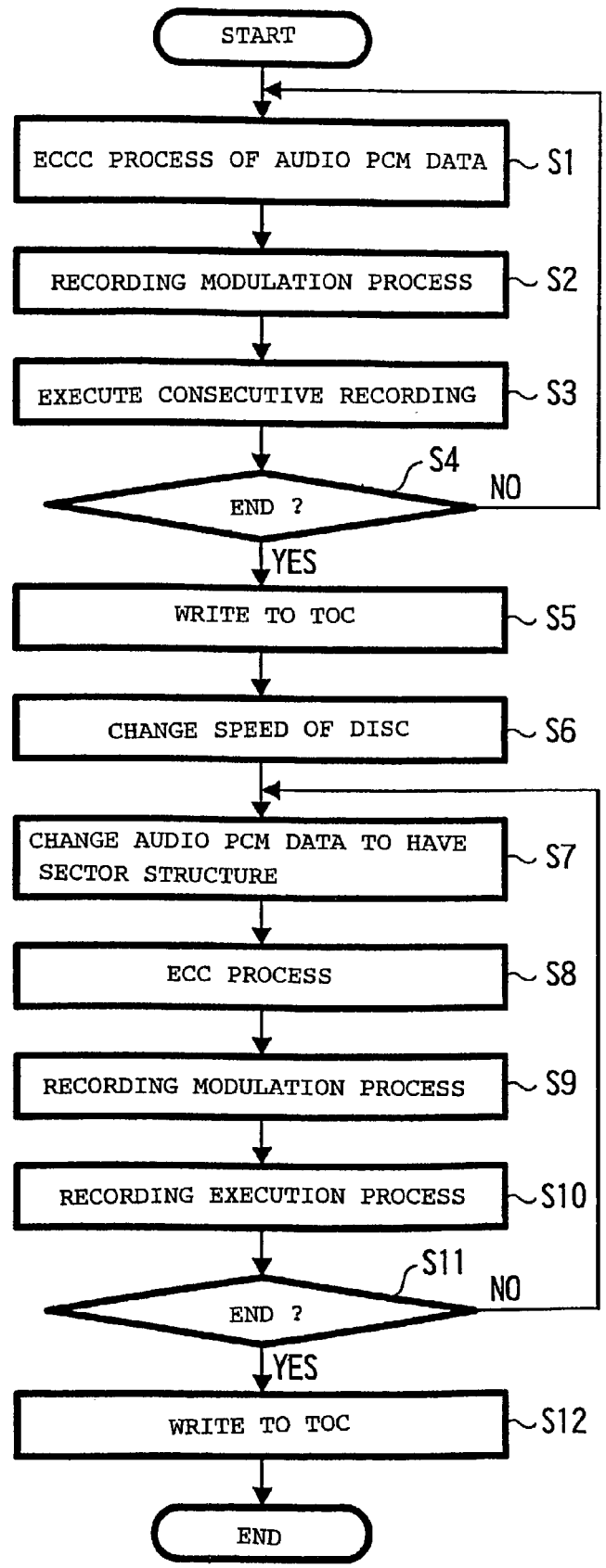
FIG. 5 is a flowchart for explaining the first embodiment of a data recording method of the present invention.

FIG. 5 is a flowchart for explaining the process flow when the audio data are recorded using the data recording apparatus of FIG. 3 by a data recording method of the first embodiment. This is an example of the authoring system. It is assumed that the music data to be recorded are already converted into PCM data. Thus, the input selector 17 is switched to the state in which the audio PCM data from the input terminal 19 are selected by the system controller 20.

In order to perform recording in a consecutive record format, the linear PCM/WAV selector 18 is switched to the state in which the audio PCM data are output to the ECC encoder 23. Then, the PCM data on the music data to be recorded are encoded in an error correcting way by the ECC encoder 23 (step S1).

Next, in the record modulating circuit 24, the audio data are recorded and modulated (step S2), supplied to the recording head 26, and then recorded in the optical disc 29 having the consecutive record format (step S3). At this point, as shown in FIG. 4, the data are formed and recorded in the recording area 34 on the inner periphery side of the optical disc 29.

When recording of the audio data having the consecutive recording format on the inner periphery side of the optical disc 29 is ended (step S4), as described before, the position of the recording area 34 and information on the contents of the audio data recorded in the recording area 34 are recorded in the read-in area 31 as TOC information (step S5).

Next, prior to recording the audio data having the file format, the linear PCM/WAV selector 18 is switched to the state in which the PCM data are output to the CD-ROM encoder 22, further the state of controlling the rotating speed of the optical disc 29 is switched, by the speed control circuit 28, to the state in which the aforementioned linear speed Vf is controlled to be a constant from the state that the linear speed Vc is controlled to be a constant, and then the rotating speed is changed (step S6).

The same audio PCM data as is recorded in the consecutive recording format are switched to the sector structured data by the CD-ROM encoder 22 (step S7), and then encoded in an error correcting way by the ECC encoder 23 (step S8). Next, in the record modulating circuit 24, the data are recorded and modulated (step S9), supplied to the recording head 26, and then recorded to the optical disc 29 (step S10). At this point, as shown in FIG. 4, the data are formed and recorded in the recording area 38 on the outer periphery side of the optical disc 29.

When recording of the audio data having the file format is ended (step S11), as described before, the position of the recording area 38 and information on the contents of the audio data recorded in the recording area 38 are recorded in the read-in area 31 and/or the read-in area 35 as TOC information (step S12).

As described before, as shown in FIG. 4, there are not only the case in which the same music data having two kinds of recording formats are recorded in one optical disc but also the case in which the audio data having the file format are recorded in all areas of one disc. In this case, too, according to the first embodiment, the music data are recorded with the rotating speed of the optical disc being defined to be higher than in the case of the consecutive record.

Further, not only the same speed recording in real time is possible but also it is possible to record the same recording pattern at N(N>1)-times faster speeds. In this case, the speed of the clock at the time of recording operation is made N times, while the optical disc 29 is rotated at the N times linear speeds of Vc or Vf.

[3] Second Embodiment of the Recording Method

The above-mentioned recording method of the first embodiment is the case of a method for applying to the authoring system. The second embodiment is the case in which the data recording apparatus of FIG. 3 is used as a recording apparatus for a consumer. In the first case of the second embodiment of the recording method, the audio data are recorded in the recordable optical disc such as CD-R and CD-RW in the recording format selected by a user from the two kinds of the above mentioned recording formats.

In the case of this embodiment, the audio data are recorded in the disc by two kinds of recording methods in the same form as in FIG. 4. However, it is not limited to the case of the same music data but there is a case in which different music data are recorded. Further, it is also possible to record the audio data in all area of one disc as were— recorded in either of the recording formats.

Figure 6:
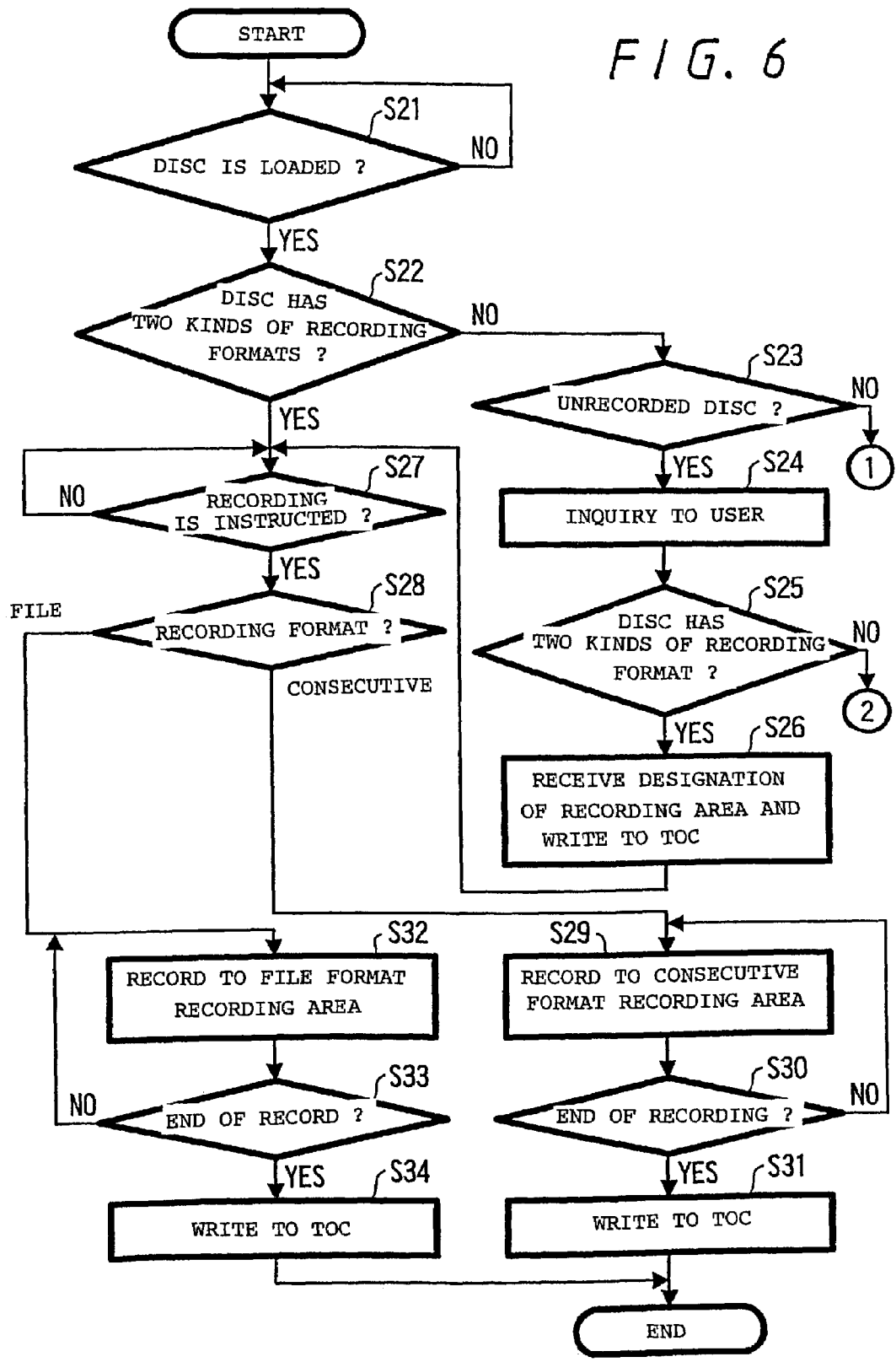
FIG. 6 is a flowchart for explaining a second embodiment of a data recording method of the present invention.
Figure 7:
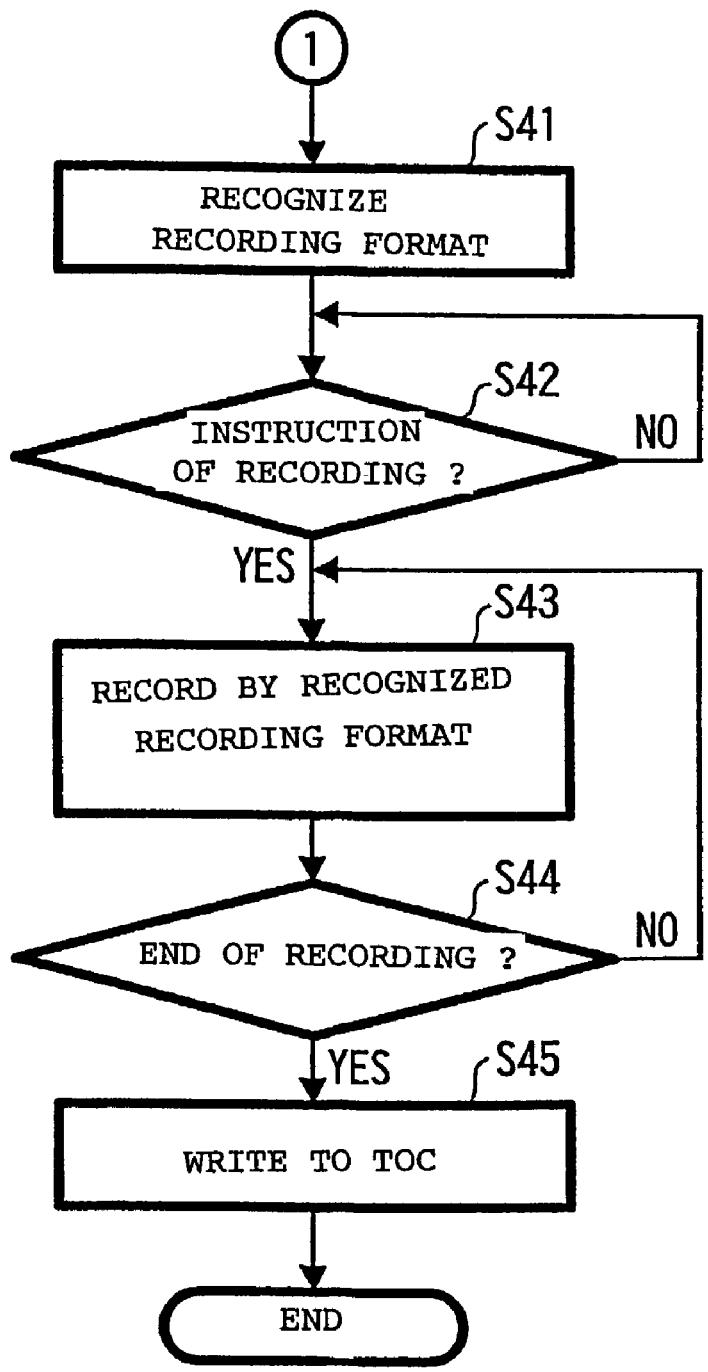
FIG. 7 is a continuation of the flowchart of FIG. 6.
Figure 8:
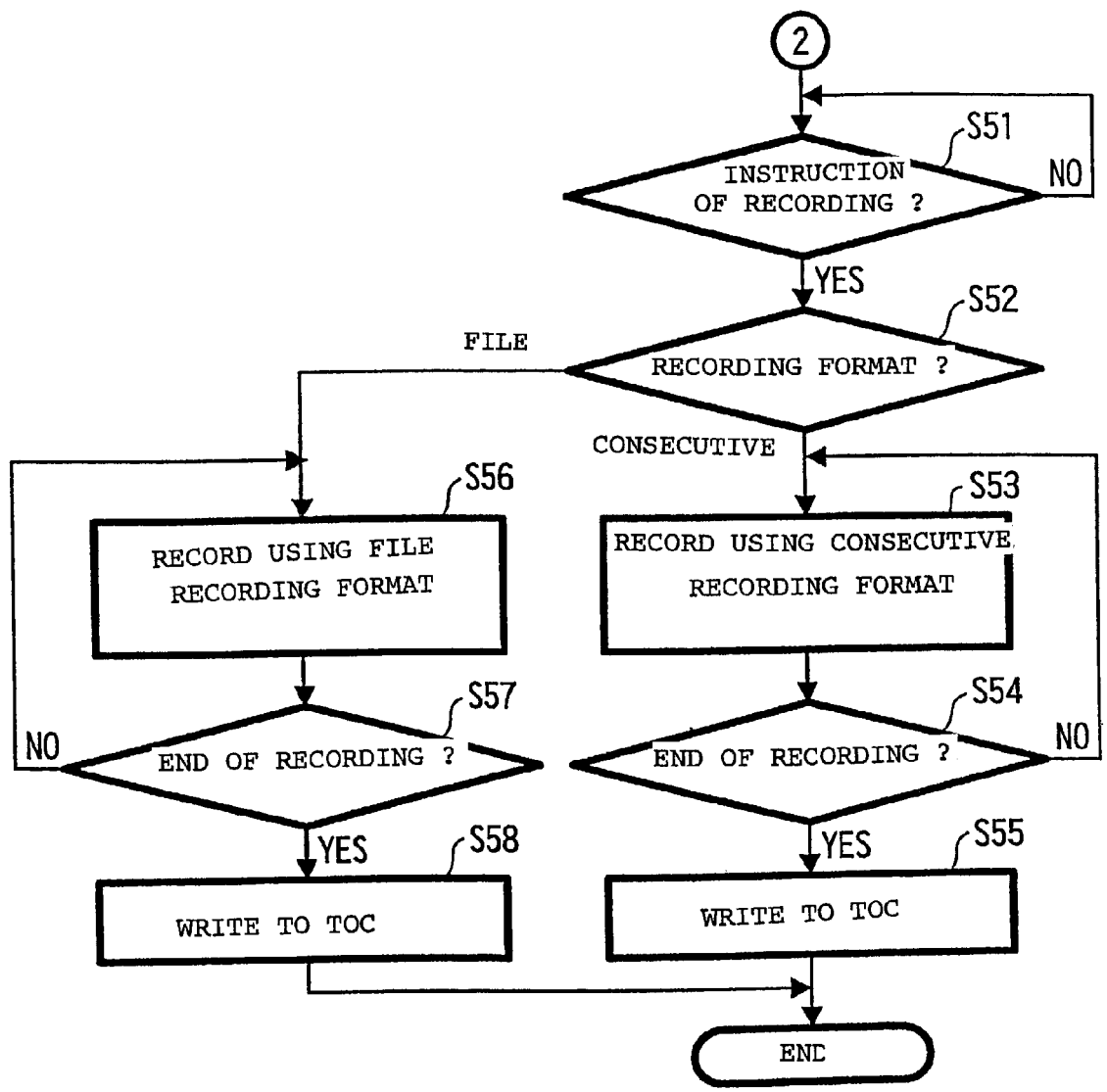
FIG. 8 is a continuation of the flowchart of FIG. 6.

FIGS. 6, 7, and 8 are flowcharts for explaining recording methods of this case.

When it is detected that the optical disc is loaded (step S21), TOC information is read-in, and then, based on the read-in information, it is judged whether or not the optical disc is a disc on which a decision has already been made to, record in two kinds of recording formats (step S22). When it is identified that the optical disc is not the disc on which a decision was made not to record in two kinds of recording formats based on the TOC information, it is judged whether or not the disc has already been recorded (step S23). If the disc has not been recorded, an inquiry is made to the user by a message shown on a display or an output by way of a voice, asking whether or not the disc is defined as one that records in two kinds of recording formats (step S24). To judge whether or not the disc has been recorded is ascertained by judging that TOC information cannot be readout from the read-in area 31, for example, in other words, by judging that nothing has been recorded therein.

Next, it is judged whether or not the disc should be recorded using two kinds of recording formats by identifying an instructed input by the user with respect to the inquiry at this step S24 (step S25). If the disc is to be recorded using two kinds of recording formats, the instructions of where to position the recording area 38 and recording area 34 of FIG. 4 is received, and then an identifier indicating that the disc should be recorded using two kinds of recording formats and information on the range and position of the recording areas 34 and 38 are written in as TOC information (step S26).

Designation of the recording areas may be carried out by, for example, a method of choosing from among several kinds of setting values, which in advance define the ratio between the sizes of the aforementioned 2 recording areas by the recording apparatus, or by a method of respectively defining the sizes of the recording areas by the user himself. According to this embodiment, however, the recording area having the consecutive recording format is set on the inner periphery side of the optical disc and the recording area having the file format is set on the outer periphery side thereof.

In addition, in stead of the recording area being designated by the user, it is possible to allocate automatically the recording areas 34 and 38 to predetermined sizes.

The procedure, when it is identified that the disc has not been recorded at step S23, and when it is identified, even if the disc has not been recorded, that the user has designated that the disc should not be recorded in two kinds of recording formats at step S25, will be described later on.

As for the disc which is judged as one to perform recording in two kinds of recording formats or is selected as one to perform recording in two kinds of recording formats and of which the recording area is designated, an instruction to start recording needs waiting for (step S27). When there is an instruction to start recording, the recording format that is designated by the user is identified (step S28).

When recording is performed in two kinds of recording formats, the recording apparatus cannot execute recording by only the instruction to start recording, but is required to designate a recording format. When the user instructs the start of recording without designating the recording format, the user is made to realize by a message and beep tones that the recording format requires designating. In this case, a display (not shown in FIG. 3) of the recording device indicates that the disc performs recording in two kinds of recording formats.

At step S28, when it is determined that the consecutive recording format is designated as a recording format, a recording head is moved to the consecutive recording area which is designated by TOC information or to the consecutive recording area which is designated at step S26 and further, an empty area is detected and recording is executed (step S29). When the recording is ended at step S29 (step S30), information on a recorded track is written in the read-in area as TOC information (step S31), and then the recording process terminates.

On the other hand, at step S28, when it is judged that the file format is designated as the recording format, the recording head is moved to the file format recording area which is designated by TOC information or to the file format recording area which is designated at step S26, and further an empty area is detected and recorded (step S32). When the recording is ended (step S33), information on the recorded track is written as TOC information (step S34), and then the recording process terminates.

Next, when it is determined by reading out TOC information from the read-in area, for example, that the disc has already been recorded, since the disc is one in which audio data have already been recorded in either of the recording formats, the recording format of the audio data already recorded is recognized from TOC information (step S41 of FIG. 7). When there is an instruction to start recording after the start of recording has been awaited (step S42), recording of the audio data is executed in the empty area in the recording format which is recognized at step S41 (step S43). When the recording the data is ended (step S44), information on the recorded track is written in the read-in area 31 or 35 as TOC information (step S45), and then the recording process terminates.

At this point, since the disc performs recording only in one of the two kinds of recording formats, unlike the disc which performs recording in the aforementioned two kinds of recording formats, designation by the user of a recording format is not required. When the remaining different recording format is designated by the user, the beep tones and the like are emitted. Information on the disc in which of the recording formats is supplied on the display of the recording apparatus, and then reported to the user.

Next, even if the disc has not been recorded, when it is judged that the user designated that the disc should not be recorded using two kinds of recording formats at step S25, subsequent to the flowchart of FIG. 8, an instruction to start recording is awaited (step S51). This instruction of the start of recording, entails the need for designating the recording format. When the user instructs the start of recording without designating the recording format, the user is informed by a message and beep tones that the designation of the recording format is needed. In this case, on the display of the recording apparatus is shown an indication of an unrecorded disc in which no recording format is set.

When there is an instruction to start recording together with an instruction of the designation of the recording format, the recording format designated by the user is judged (step S52). At step S52, when it is judged that the consecutive recording format is designated as the recording format, recording is performed by using the consecutive recording format (step S53). When the recording is ended at step S53 (step S54), information on the recorded track is written in the read-in areas 31 and 35 as TOC information (step S55), and then the recording process terminates.

On the other hand, at step S28, when it is judged that the file format is designated as the recording format, recording is performed by using the file format (step S56). When the recording is ended at step S56 (step S57), information on the recorded track is written in the read-in areas 31 and 35 as TOC information (step S58), and then the recording process terminates.

[4] Third Embodiment of the Recording Method

The third embodiment is the case of the recording apparatus for the consumer, as shown in the aforementioned FIG. 4, and an example of the case in which the same music data are recorded in different areas of one disc using two kinds of recording methods.

[4-1] Data Recording Apparatus

Figure 9:
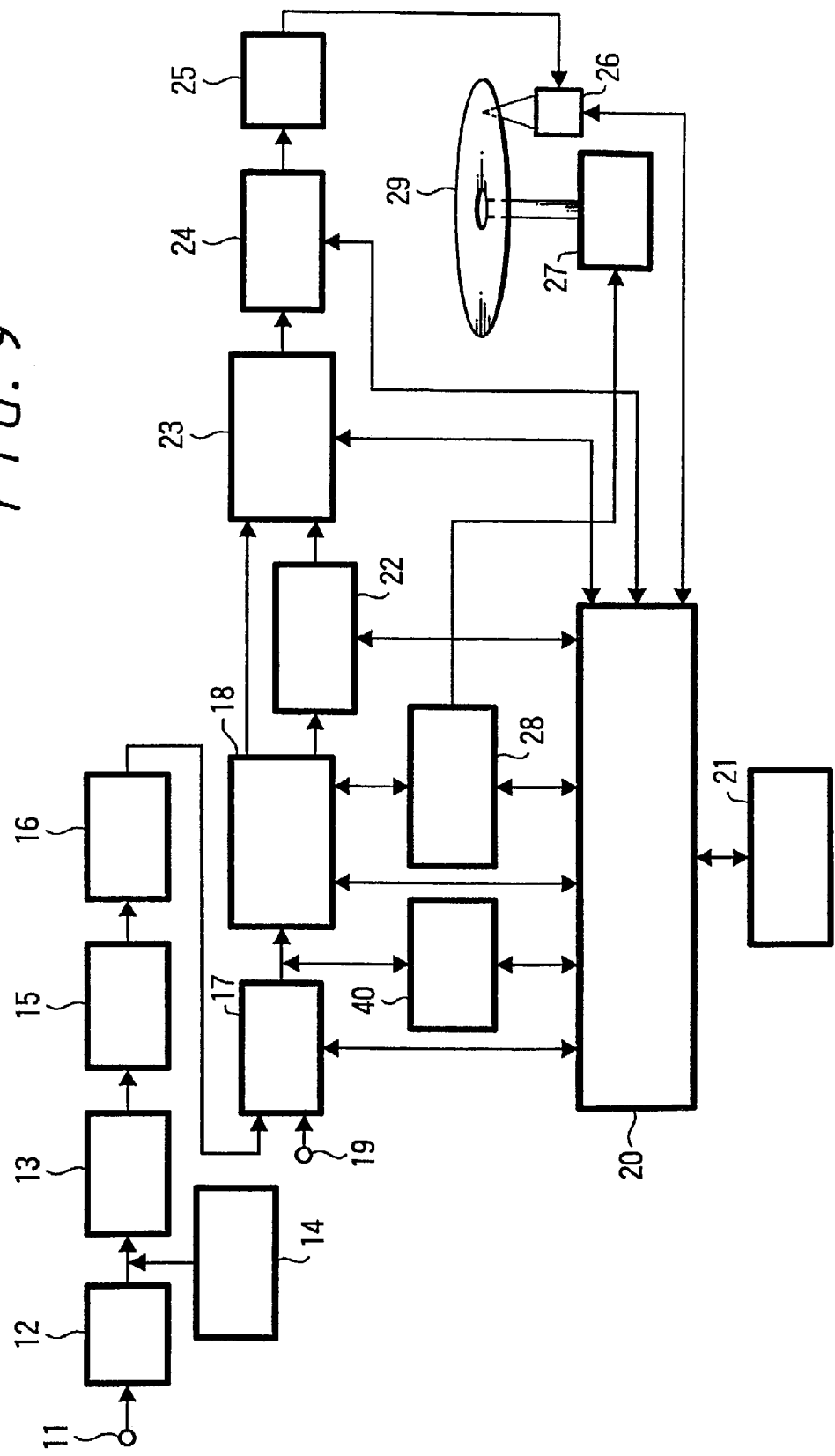
FIG. 9 is a block diagram of an embodiment of the data reproducing apparatus of the present invention.

An example of the data recording apparatus of this third embodiment is shown in FIG. 9. For the data recording apparatus of this example, the basic elements of the hardware components are the same as the data recording apparatus of FIG. 3. The point different therefrom is that a buffer memory 40 for temporarily storing the output from the input selector 17 is supplied.

The data recording apparatus in the case of the third embodiment can record the data by the recording method of the aforementioned second embodiment, and further has the function of recording the same music data in the consecutive recording format and the file format. The key input unit 21 includes a 2 kinds-simultaneous-recording key for initiating the function. This function is valid for the case in which the disc is capable of recording two kinds of recording formats. Thus, for the third embodiment, the procedures of steps from step S21 to step S26 of the aforementioned second embodiment are performed.

[4-2] Data Recording Method

Figure 10:
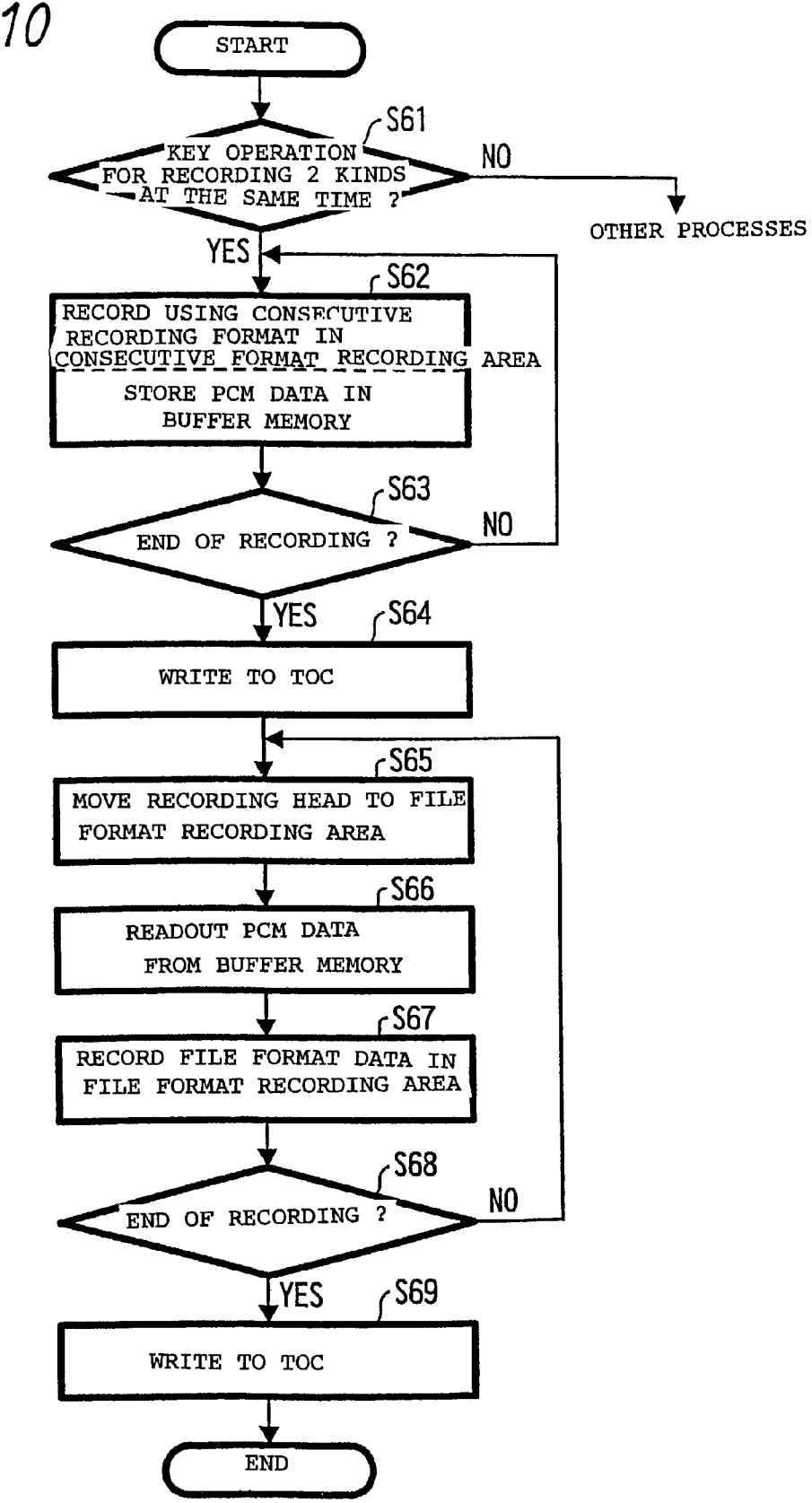
FIG. 10 is a flowchart for explaining the first embodiment of the data reproducing method of the present invention.

In the state in which the disc capable of recording in two kinds of recording formats is loaded, if the 2 kinds-simultaneous-recording key is operated, as shown in the flowchart of FIG. 10, the function for recording the same music data in the consecutive record format and the file format is executed.

That is to say, if the 2 kinds-simultaneous-recording key is operated (step S61), audio data are sequentially recorded in the consecutive record format in an empty area of the consecutive format recording area recognized from TOC information. At this time, the audio PCM data are stored in the buffer memory 40 simultaneously (step S62). When the recording is ended at step S61 (step S63), information on the recorded track is written in the read-in area 31 or 35 as TOC information (step S64).

Next, the recording head 26 is moved to the empty area of the recording area with the file format recognized from TOC information (step S65), and then the audio PCM data recorded in the consecutive record format as have been accumulated in the buffer memory 40, are readout (step S66).

By way of the CD-ROM encoder 22, the ECC encoder 23, the record modulating circuit 24, and the recording amplifier 25, the audio PCM data are supplied to the recording head 26 and then the same music data are recorded in the empty area of the file format recording area in the file format (step S67). When the recording is ended at step S67 (step S68), information on the recorded track is written in the read-in area 31 or 35 as TOC information (step S69), and then the process of recording 2 kinds simultaneously is terminated.

In accordance with the third embodiment, the user can record the music data on one disc as the consecutive recording data having a CD format and data having the file format only by operating the 2 kinds-simultaneous-recording key. Thus, this is quite convenient.

[5] Embodiment of a Data Reproducing Apparatus

Figure 11:
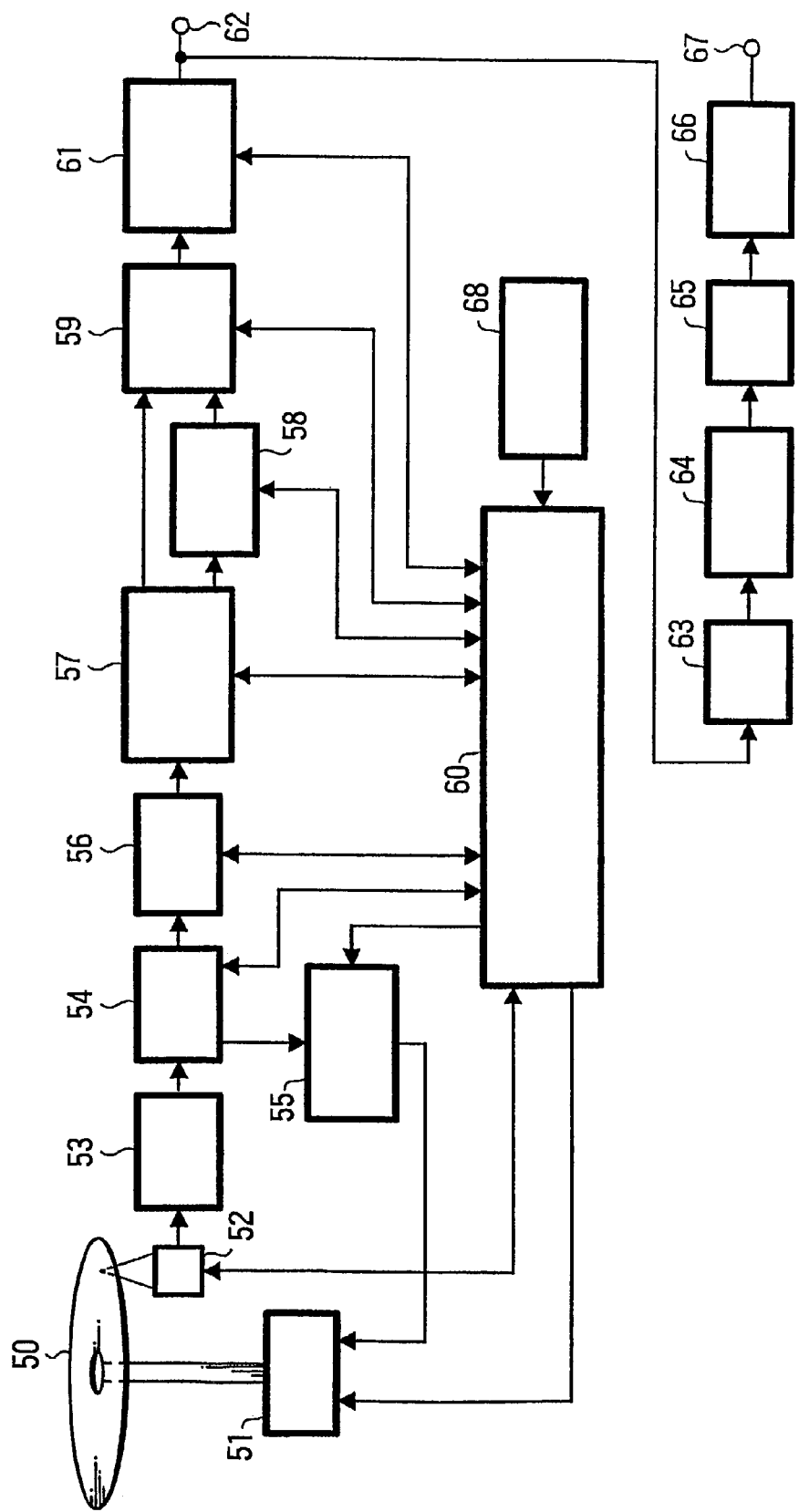
FIG. 11 is a block diagram of another embodiment of the data reproducing apparatus of the present invention.

FIG. 11 is a block diagram of a data reproducing apparatus of the present embodiment. The data reproducing apparatus is a reproducing apparatus of a recording medium recorded by the data recording apparatus of FIG. 3 or 9, and corresponds to 2 channel stereo signals. Therefore, it is considered that the data record reproducing apparatus is structured by a combination of the apparatus of FIG. 3 and the apparatus of FIG. 11 or a combination of the apparatus of FIG. 9 and the apparatus of FIG. 11.

An optical disc 50 is a disc in which audio data are recorded in two kinds of recording formats by the aforementioned recording method. As indicated in the foregoing description, for the optical disc 50, as shown in FIG. 4, there are a type, in which a recording area having the consecutive recording format as the recording area and a recording area having the file format coexist, and another type, in which the data are recorded in any one of the consecutive recording format and the file format.

The optical disc 50 is rotated and driven by a spindle motor 51 at the same speed as the conventional CD player. The data readout by this optical disc 50 are supplied to a demodulating circuit 54 by way of an RF circuit 53, and then a demodulating process, which corresponds to modulation performed to the readout data, is executed. A speed control circuit 55 controls the speed of the spindle motor 51 in order for the linear speed Vc to become a constant when the standard reproducing speed has already been attained at an onefold speed, based on the data demodulated by this demodulating circuit 54.

According to this embodiment, the optical disc 50 is capable of reproducing the readout data at a tenfold faster speed which is 10 times faster than the aforementioned onefold speed or at twentyfold faster speeds which are 20 times faster than the aforementioned onefold speed by rotating the spindle motor 51. Thus, the speed control circuit 55 is structured to be controlled by a system controller 60.

Data demodulated by the demodulating circuit 54 are supplied to an ECC decoder 56. TOC information oN the data demodulated by the demodulating circuit 54 is supplied to the system controller 60, and then used for several kinds of control.

In the ECC decoder 56, an error correcting procedure using CIRC is executed, and the error corrected audio PCM data or the audio data having the sector structure are supplied to a linear PCM/WAV selector 57. The audio data, of which errors could not have been corrected, are supplied to the selector 57 by adding an error flag for indicating this situation.

The system controller 60, as explained hereinafter, generates a selecting signal for selecting and controlling the selector 57 when the reproduced data are the consecutive recording data and the data have the file format, based on TOC information read-in from the optical disc 50 and an input of an selection instruction from a key input part 68.

When the selector 57 receives a selecting signal for reproducing the data of the consecutive recording format from the system controller 60, the data from the ECC decoder 56 are directly supplied as they are to an error interpolating circuit 59. When the selecting signal for reproducing the data having the file format from the system controller 60 is received, the data from the ECC decoder 56 are supplied to a CD-ROM decoder 58.

The CD-ROM decoder 58 analyzes the data having the sector structure and then changes them to the audio PCM data. The audio PCM data are supplied to the error interpolating circuit 59.

The error interpolating circuit 59 checks an error flag which is attached to the input data, and the error interpolating process using the before and behind data, for example, is executed to the audio data of the error to which the error correction is not performed. The output data of the error interpolating circuit 59 are supplied to a data outputting speed control circuit 61.

The data outputting speed control circuit 61 includes a buffer memory, the input data are buffered to a buffer memory, and then the data are output at a necessary speed (1.4112 Mbps).

In this case, in the case of reproducing the recorded audio data having the consecutive recording format, in the same way as the conventional CD player, the data can be output without controlling the output speed. In the case of reproducing the recorded audio data having the file format, as described before, since the data are recorded by rotating the disc at the linear speed Vf which is higher than the linear speed Vc, the data can be output without controlling the outputting speed in the same way as the conventional CD player, except that a path through the CD-ROM decoder 58 is used.

However, in this embodiment, even if the data having any kind of recording format are reproduced, by controlling the speed control circuit 55 by the system controller 60, the optical disc 50 is rotated at high speeds such as 10 times faster and 20 times faster as described before, the data are buffered in a memory in the data outputting speed control circuit 61, and thus the data can be output at a necessary (1.4112 Mbps) speed.

The digital data from the data outputting speed control circuit 61 are output to the outside from a digital outputting circuit 62, and further supplied to a D/A converter 63, and then converted to analog audio signals. The converted analog audio signals are output to the outside from an analog output terminal 67 by way of an aperture circuit 64, a low pass filter 65, and the line amplifier 66.

Figure 12:
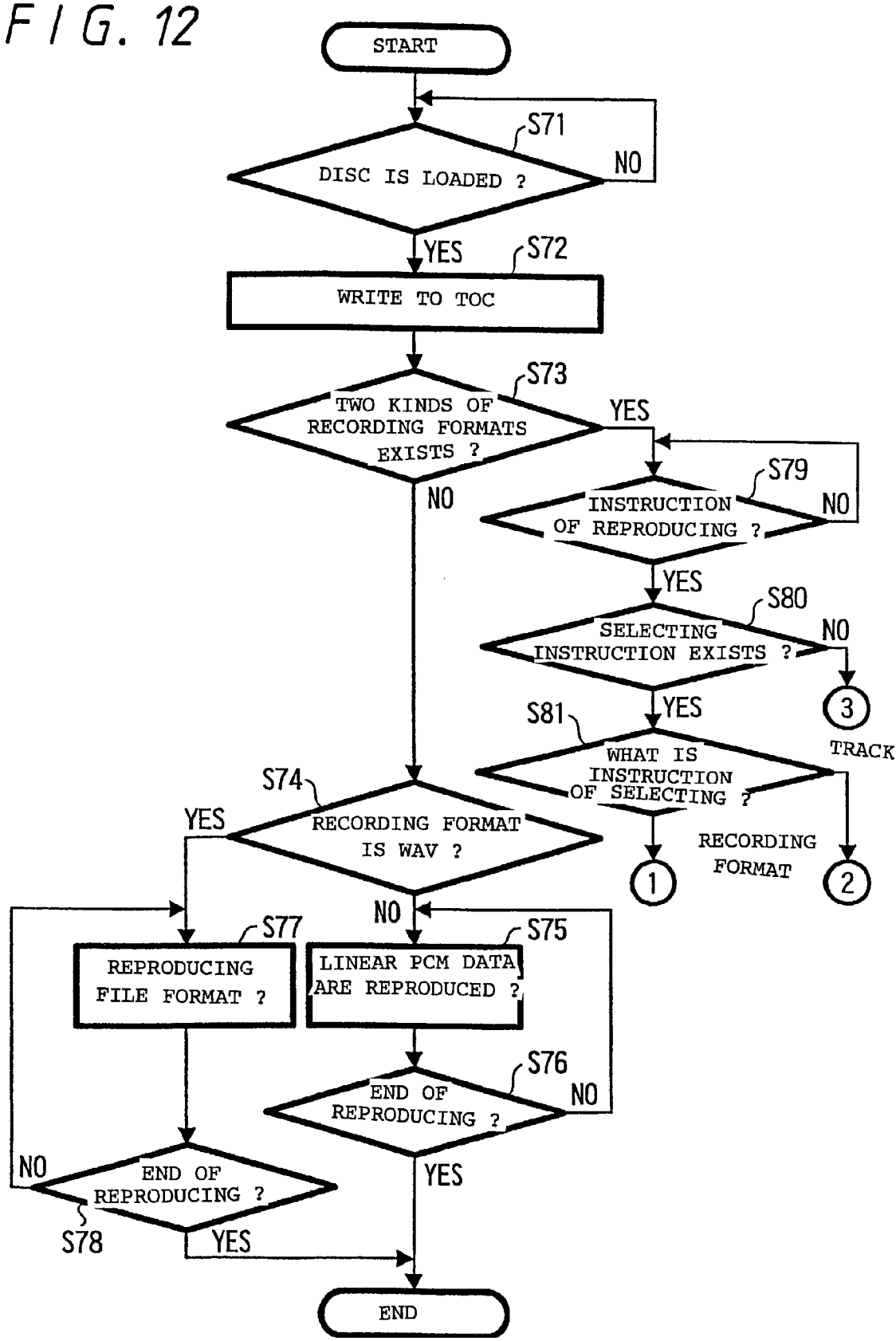
FIG. 12 is a part of a flowchart for explaining the first embodiment of the data reproducing method of the present invention.

The reproducing operations of the data reproducing apparatus of this embodiment are explained with reference to the flowcharts of FIGS. 12, 13, and 14.

In the data reproducing apparatus of this embodiment, when it is detected that the optical disc is loaded (step S71), TOC information thereof is read-in (step S72), and then it is checked to determine the type of disc.

By checking TOC information at step S72, it is judged whether or not the loaded optical disc is one in which the audio data are recorded coexistently in two kinds of recording formats (step S73). When it is found that the disc is not one in which the audio data are coexistently recorded in two kinds of recording formats at step S73, the recording format of the recorded data of the disc is determined from the TOC information (step S74).

At step S74, when it is determined that the recording format is the consecutive recording format, the linear PCM/WAV selector 57 of the reproducing apparatus of FIG. 11 is set as the condition for providing the PCM data to the error interpolating circuit 59 not via the CD-ROM decoder 58, and then the audio PCM data corresponding to the consecutive recording formats are reproduced (step S75). When a halt key is operated and it is detected that the end of reproducing is set, the operation of reproducing the audio PCM data corresponding to the consecutive recording format terminates (step S76).

At step S74, when it is detected that the recording format is the file format, the linear PCM/WAV selector 57 of the reproducing apparatus of FIG. 11 is changed to the state of providing the PCM data to the CD-ROM decoder 58, and then it is performed to reproduce the audio PCM data corresponding to the file format (step S77). When the halt key is operated and it is detected that the end of reproducing is set, the operation of reproducing terminates (step S78).

At step S73, when it is detected that the audio data having two kinds of recording formats exist together and are recorded in the disc, the operation of reproducing is awaited (step S79). If the operation of reproducing is performed, it is performed to decide whether or not the indication of selecting a reproducing position (reproducing track position) or a recording format corresponds to the indication of reproducing (step S80). When it is identified that the indication of selecting is made correctly, it is performed to judge whether the instruction of selecting is the instruction of selecting the recording format or the instruction of selecting the track position (step S81).

Figure 13:
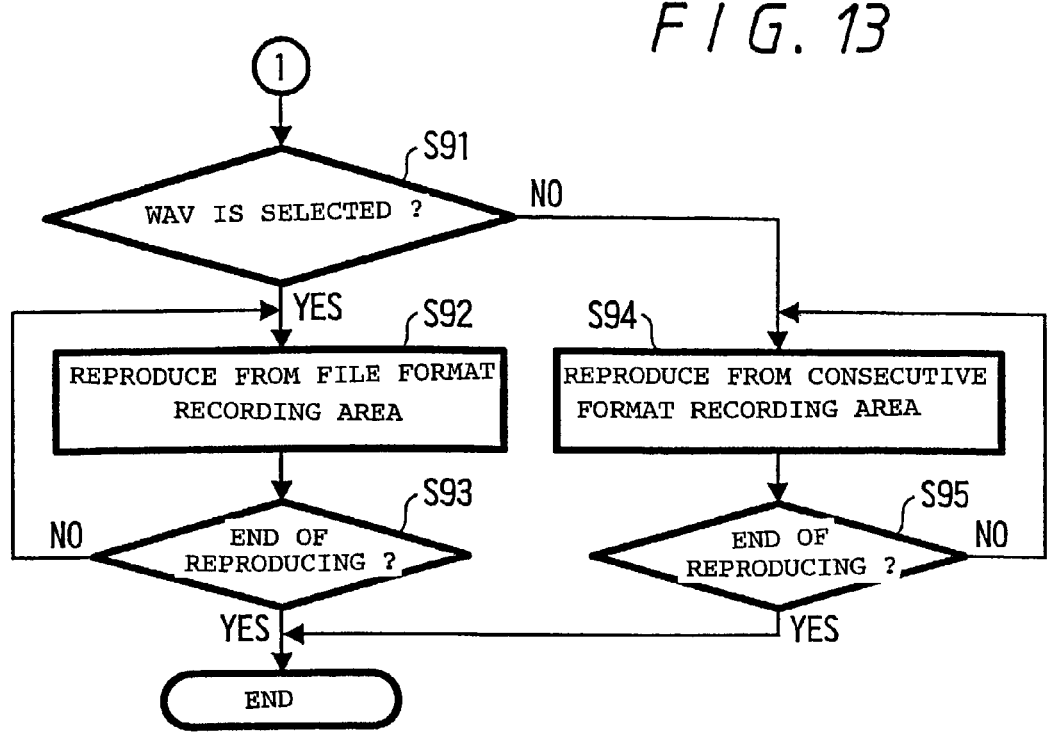
FIG. 13 is a continuation of the flowchart of FIG. 12.

When it is identified that the instruction of selecting the recording format is made correctly at step S81, it is performed to judge whether the file format is selected or not (step S91 of FIG. 13). If the file format is indicated, based on TOC information, a pick up 52 is moved to the file format recording area, the data are readout from the file format recording area, decoding process is performed to the readout data in a file formatting way, and then it is performed to reproduce the audio PCM data (step S92). When the halt key is operated and it is detected that the end of reproducing is set, the operation of reproducing terminates (step S93).

At step S91, when it is identified that the consecutive recording format is instructed for its selection, the pick up 52 is moved to the consecutive format recording area based on TOC information, the data are readout from the consecutive format recording area, decoding process is performed to the readout data in a consecutive record format, and then it is performed to reproduce the audio PCM data (step S94). When the halt key is operated and it is detected that the end of reproducing is set, the operation of reproducing terminates (step S93).

Figure 14:
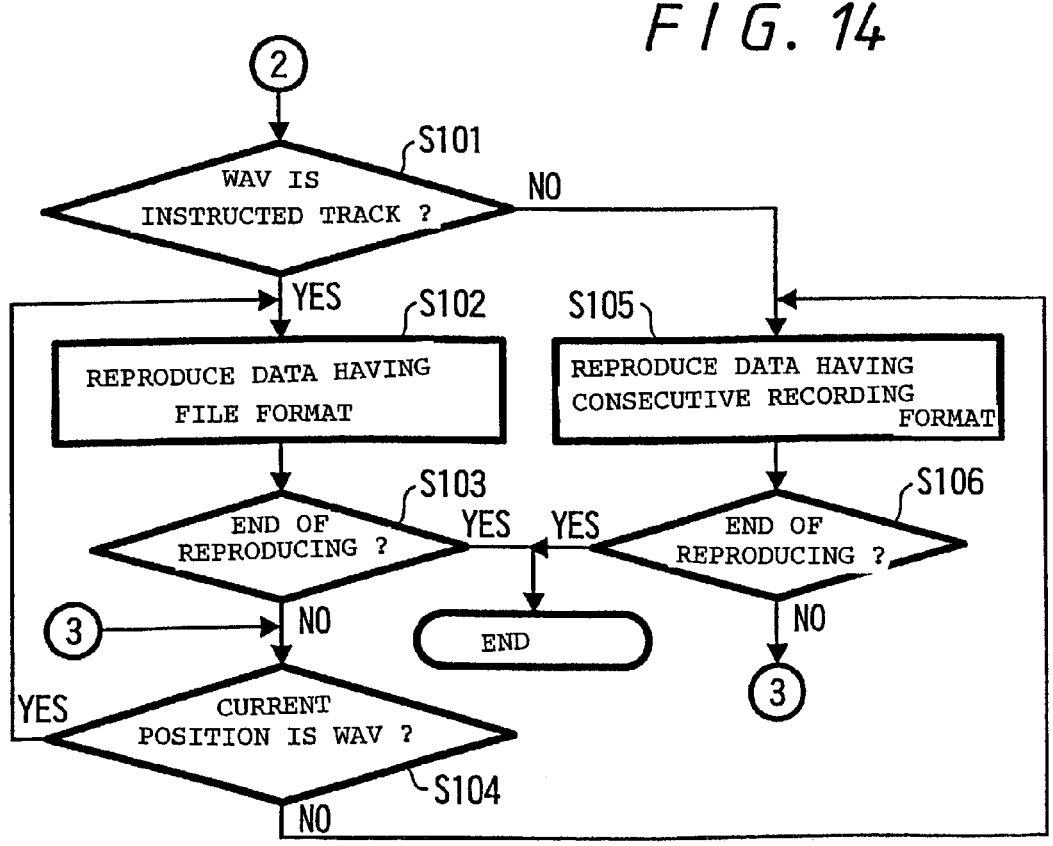
FIG. 14 is a continuation of the flowchart of FIG. 12.

At step S81, when it is identified the instruction of selecting is the instruction of selecting the position of the track, based on TOC information, it is performed to judge whether or not the instructed position of the track is within the file format recording area (step S101 of FIG. 14). If the position of the track is within the file format recording area, the audio PCM data are reproduced for the readout data by performing decoding process in a file format (step S102).

When it is performed to judge whether or not the end of reproducing is set (step S103) by the halt key being operated and it is detected that the end of reproducing is set, the operation of reproducing terminates. Further, at the time of identifying that the end of reproducing is not made at step S103, it is performed to judge whether or not the current position for reproducing is within the file format recording area (step S104). If it is within the file format recording area, the step S102 is executed again, and it is continued to reproduce the audio PCM data by performing decoding process corresponding to the file format for the readout data.

At step S104, when it is identified that the current position for reproducing is not within the file format recording area, a step S105 is executed. At step S101, when it is identified that the position of the track which is selected and instructed is not within the file format recording area, the step S105 is executed in the same way.

At this step S105, it is recognized that the position for reproducing is within the consecutive format recording area, and then it is performed to reproduce the audio PCM data in relation to the consecutive recording format for the data readout from the disc. When it is performed to judge whether or not the end of reproducing is set (step S106) by the halt key being operated and it is detected that the end of reproducing is set, the operation of reproducing terminates. At the time of identifying that the end of reproducing is not made at step S106, the step S104 is executed, and it is performed to judge whether or not the current position for reproducing is within the file format recording area. If it is within the consecutive format recording area, it is continued to reproduce the audio PCM data by performing decoding process in relation to the consecutive recording format. If it is within the file format recording area, the step S102 is executed, and it is performed to reproduce the audio PCM data by performing decodng process corresponding to the file format.

As indicated in the aforementioned description, in accordance with the data reproducing apparatus of this embodiment, it is possible to handle two kinds of recording data such as the consecutive recording format and the file format. The user can reproduce the data without paying attention to the recording format, while the user can reproduce the audio data having the favorable recording format by selecting the recording format. Thus, the user can use very conveniently.

[6] Third Embodiment of the Data Recording Method

According to the aforementioned embodiment, the audio data are recorded in the optical disc at the same density as in the conventional CD. According to the third embodiment, there are two possibilities, the one being the case of performing recording at the same recording density (hereinafter, single density is used to refer to this density) as the conventional CD or the other being the case of recording the data at higher recording density; in the following explanation, twofold high density (hereinafter, double density is used to refer to this density). In the third embodiment, as a recording medium, there are three kinds of discs such as the single density disc, the double density disc, and a mixing type disc having the single and double densities. For respective these 3 kinds of discs, the identification data for identifying respective these 3 kinds of discs are included in TOC information of a read-in area of the disc for recording.

According to the data recording method of the third embodiment, the single density recording area of the single density disc or the mixing type disc is interchangeable with the conventional CD, and the audio data are recorded in the aforementioned consecutive recording format capable of being reproduced by the CD player. The audio data having the aforementioned file format are recorded in the double density recording area of the mixing type disc or the double density disc.

It may be possible to record not only the single or double density identification data but also the identification data on the recording formats in TOC information together.

The data recording apparatus used in the recording method of the third embodiment can have the same structure as the data recording apparatus of the aforementioned embodiment, except that it is possible to perform recording at double density. This fact can be applied to the recording apparatus not only for the authoring system but also for the consumer.

In the case of the data recording apparatus for the consumer, the identification data, which indicate whether the disc, which has the record in-the read-in area thereof, has the single density or the double density, are readout. In the case of the single density, the audio data are recorded in the consecutive recording format. In the case of the double density, the audio data are recorded in the file format.

In the case of the mixing type disc having the single and double densities, recording is performed using the consecutive recording format or the file format in accordance with the recording position of whether it is the single density or the double density. In the case of the mixing type disc having the single and double densities, it is possible to perform recording by selecting the double density recording area or the single density recording area which has been determined in advance depending on selection of the recording format by the user.

As described in the aforementioned description, in the case in which the audio data are written using the file format, for the aforementioned recording at a onefold speed, the number of the audio data comes to be less than the consecutive recording format. However, in the third embodiment, there is no reduction in the number of data, since the audio data are recorded in the disc or the area at high density.

[6-1] Recording Medium

Figure 15:
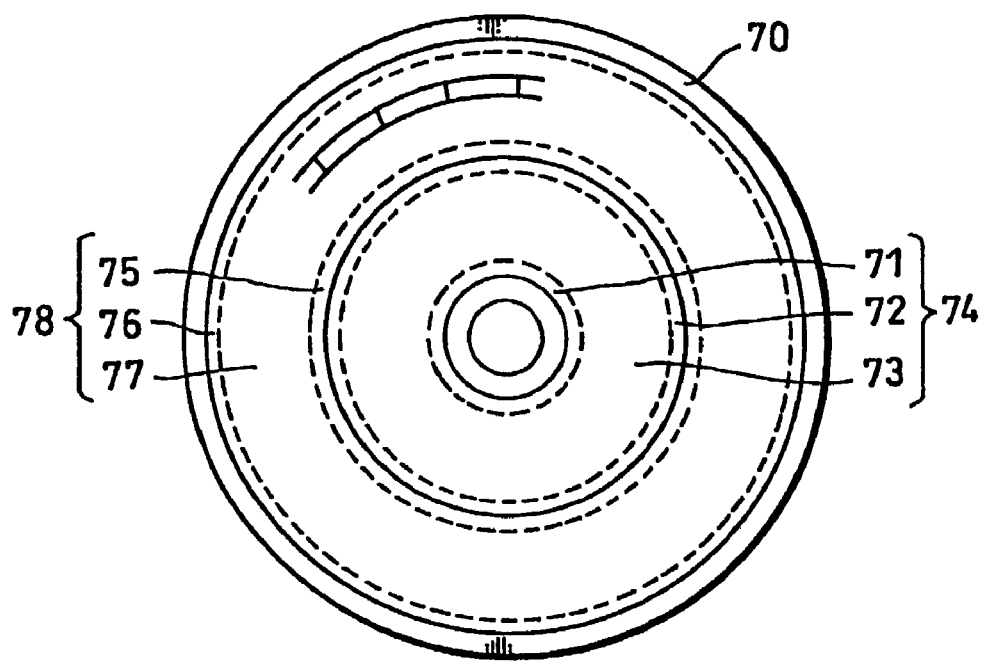
FIG. 15 illustrates the second embodiment of the recording medium of the present invention.

FIG. 15 is an example of the mixing type disc having the single and double densities and indicates a disc 70 in which the audio data are written by the embodiment in which the data recording method of the third embodiment is applied-to the authoring system. For this disc 70, the disc that is interchangeable with the conventional CD and CD-ROM is used for reproducing.

In the case of FIG. 15, in the same way as the conventional CD, the audio PCM data are also encoded in an error correcting way in a data area 73 of a single density recording area 74 on the inner periphery side, and the data which are modulated and recorded are recorded consecutively. Therefore, it is possible to reproduce the audio data of the single density recording area 74 by the conventional popular CD player. A read-in area 71 and a readout area 72 are included in the single density recording area 74.

In the optical disc 70 of the case of FIG. 15, a double density recording area 78 on the side of an outer periphery is defined as a higher density recording area than the recording area 74 on the side an inner periphery. In this case, it is defined that the double density recording area 78 can record the data at higher recording density which is 2 times the density recording area 74. In a data area 77 of the double density recording area 78 thereof, in this case, the same data as the audio PCM data recorded in the single density recording area 74 are made a sector structure by the CD-ROM encoder. Further, the data are encoded in an error correcting way, modulated for recording, and then recorded at double density.

Therefore, the audio data of the double density recording area 78 are capable of being reproduced by a device, such as a personal computer, capable of reading the double density data having the CD-ROM format having the file format. At this point, a read-in area 75 and a readout area 76 are contained in the double density recording area 78.

TOC information of this disc 70 is recorded in the read-in area 71. It may be possible to record a part of TOC information in the read-in area 75.

Meanwhile, the optical disc 70 of the embodiment is made by forming a pit line in accordance with the recorded data by the same system as the authoring system which creates a master disc of CD. On the other hand, the double density recording area 78 has the double density. Thus, this point is different from the conventional authoring system.

In the case of the optical disc 70 of the third embodiment, since the density of the recording area 78 having the file format is double, it is possible to secure a wider recording area 74 in case the same music data are recorded in the recording area 74 and the recording area 78. Therefore, it comes to be possible to reduce a decrease in the number of recordable music in comparison with the conventional CD.

That is to say, the number of music which the optical disc 30 of the aforementioned first embodiment can record is nearly only a half as many as the conventional CD. On the other hand, the number of music which the optical disc 70 of the third embodiment can record is up to two thirds as many as the conventional CD. Thus, it becomes possible to reduce a decrease in the number of recordable music. By adding to the recording density of the double density recording area 78, it becomes possible to further reduce a decrease in the number of recordable music in comparison with the conventional CD.

In the meantime, in the case of the optical disc 70 of this embodiment, it is possible to record the audio data, the contents of which are different from the audio data recorded in the single density recording area 74, in the double density recording area 78. Also in the case of the optical disc 30 of the first embodiment, it may be possible to record the audio data having different contents in the recording area 34 and the recording area 38.

[6-2] Data Reproducing Method

Next, the embodiment of the data reproducing method corresponding to the data recording method of the third embodiment will be explained.

The data reproducing method in this case can have the same structure as the data reproducing method shown in FIG. 11 with the exclusion of a point in which the audio data recorded using the double density are capable of being reproduced.

Figure 16:
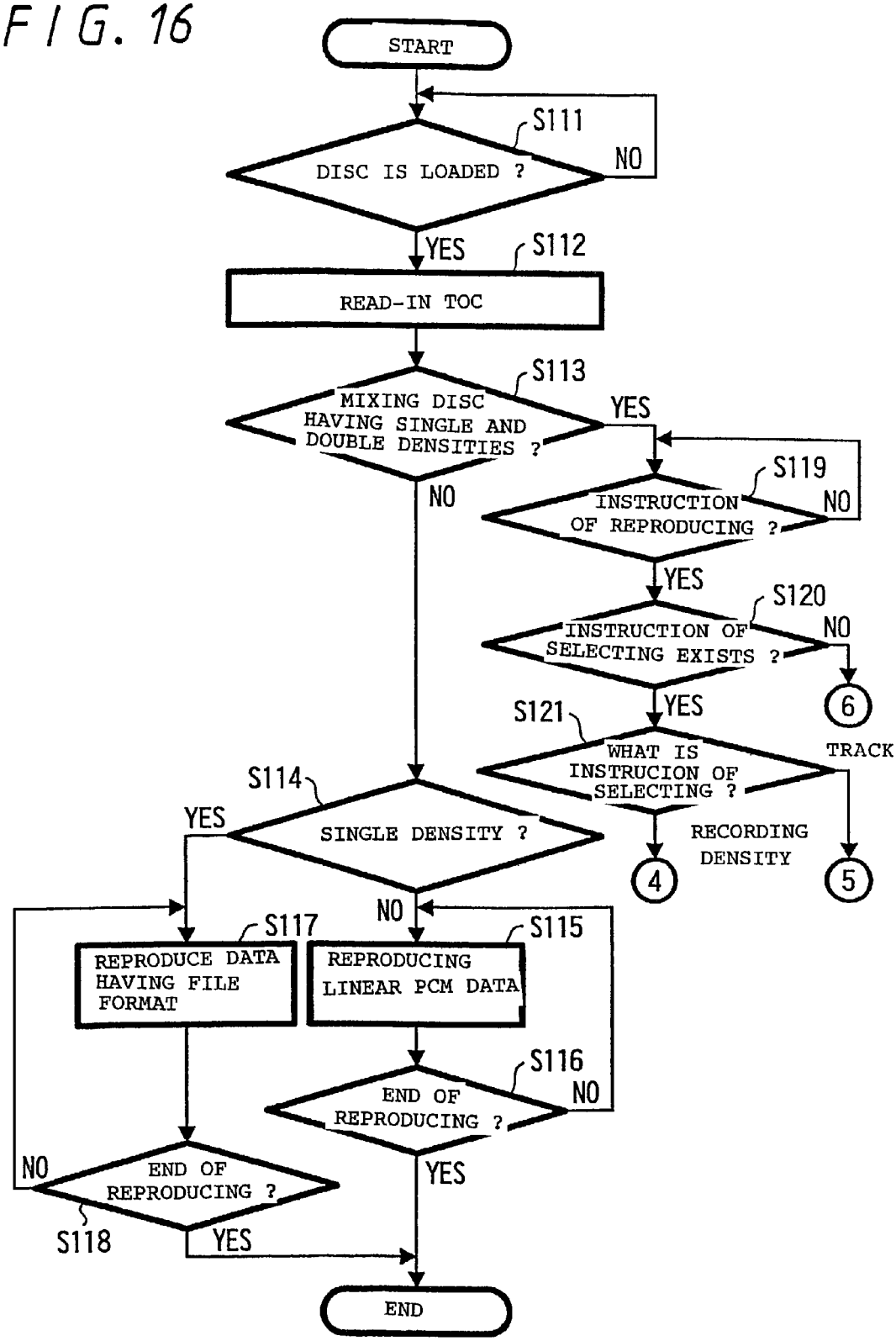
FIG. 16 is a part of the flowchart for explaining the second embodiment of the data reproducing method of the present invention.

The operations of reproducing in the data reproducing method of this embodiment will be explained with reference to the flowchart of FIGS. 16, 17 and 18.

In the data reproducing apparatus of the third embodiment, at the time of detecting that the optical disc is loaded (step S111), TOC information thereof is read-in (step S112), and then the type of the disc is checked based on readout TOC information.

By checking TOC information at step S112, it is performed to identify whether or not the optical disc which has been loaded is a disc in which the audio data having two kinds of recording density (two kinds of recording formats) are coexistently recorded (step S113). When it is identified that the optical disc is not a disc in which the audio data having two kinds of recording density are recorded coexistently at step S113, the recording density of the recording data of the disc is identified from TOC information (step S114).

As a result of identifying at step S114, if it is determined that the recording density is a single density, the audio data having the consecutive recording format are recorded in the disc. Thus, data readout from the disc are not processed by the CD-ROM decoder but the audio PCM data corresponding to the consecutive recording format are reproduced by performing decoding process using the error interpolating circuit and the like (step S115). When the halt key is operated and it is detected that the end of reproducing is set, the operation of reproducing the audio data, which are recorded using the consecutive recording format, terminates (step S116).

As a result of identifying at step S114, when it is identified that the recording density is the double density, since the audio data having the file format are recorded in the disc, the data readout from the disc are passed to the CD-ROM decoder, decode-processed and prepared for reproducing by the CD-ROM decoder and the like, and then the audio PCM data corresponding to the file format are reproduced (step S117). When the halt key is operated and it is detected that the end of reproducing is set, the operation of reproducing the audio data having the file format terminates (step S118).

At the time of identifying the mixing type disc having the single and double densities at step S113, the instruction for reproducing is awaited (step S119). If there is the instruction for reproducing, it is performed to judge whether or not the instruction for selecting the position of reproducing (the position of reproducing a track) or the type of recording accompanies the indication of reproduction (step S120). When it is identified that the instruction of selecting is accompanied at step S120, it is performed to judge whether or not this instruction of selecting equals to that the instruction of selecting the recording density is the instruction of the selecting the track position (step S121).

Figure 17:
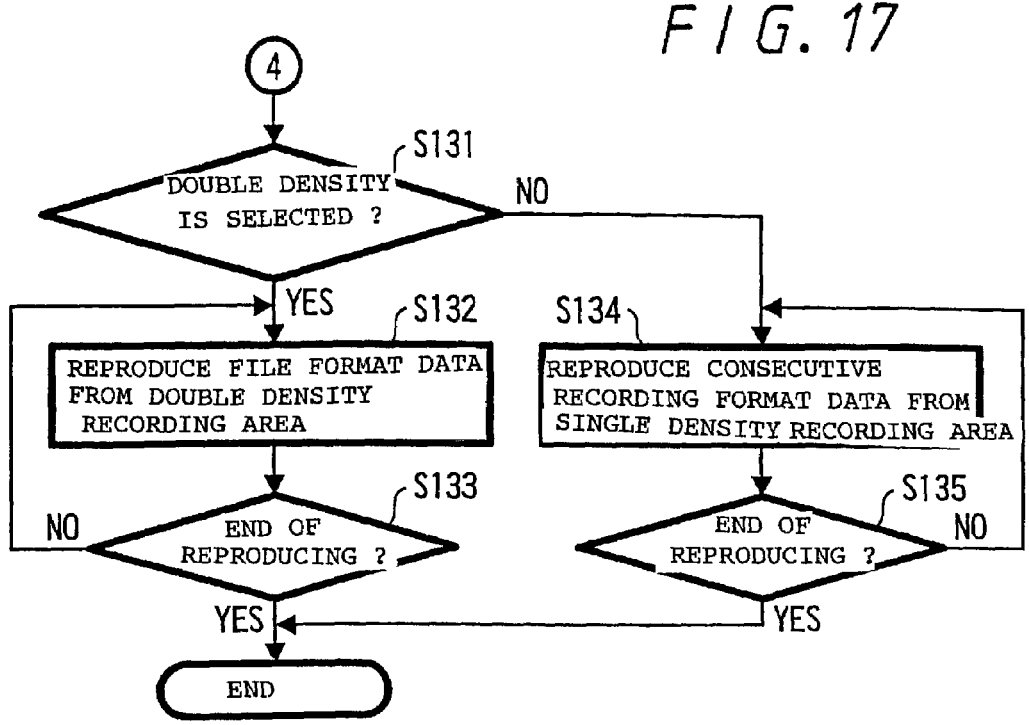
FIG. 17 is a continuation of the flowchart of FIG. 16.

When it is identified that the indication of selecting the recording density at step S121 is accompanied, it is performed to judge whether or not what was selected is the double density (step S131 of FIG. 17). If the double density is selected, the pickup is moved to the double density recording area and data are readout from the double density recording area based on TOC information. Then, for the readout data, the audio PCM data corresponding to the file format are reproduced (step S132). When the halt key is operated and it is detected that the end of reproducing is set, the operation of reproducing terminates (step S133).

At step S131, when it is identified that the selected instruction is about the single density, the pickup is moved to the single density recording area and the data are readout from the single density recording area based on TOC information. Then, for the readout data, the audio PCM data corresponding to the consecutive recording format are reproduced (step S134). When the halt key is operated and it is detected that the end of reproducing is set, the operation of reproducing terminates (step S133).

Figure 18:
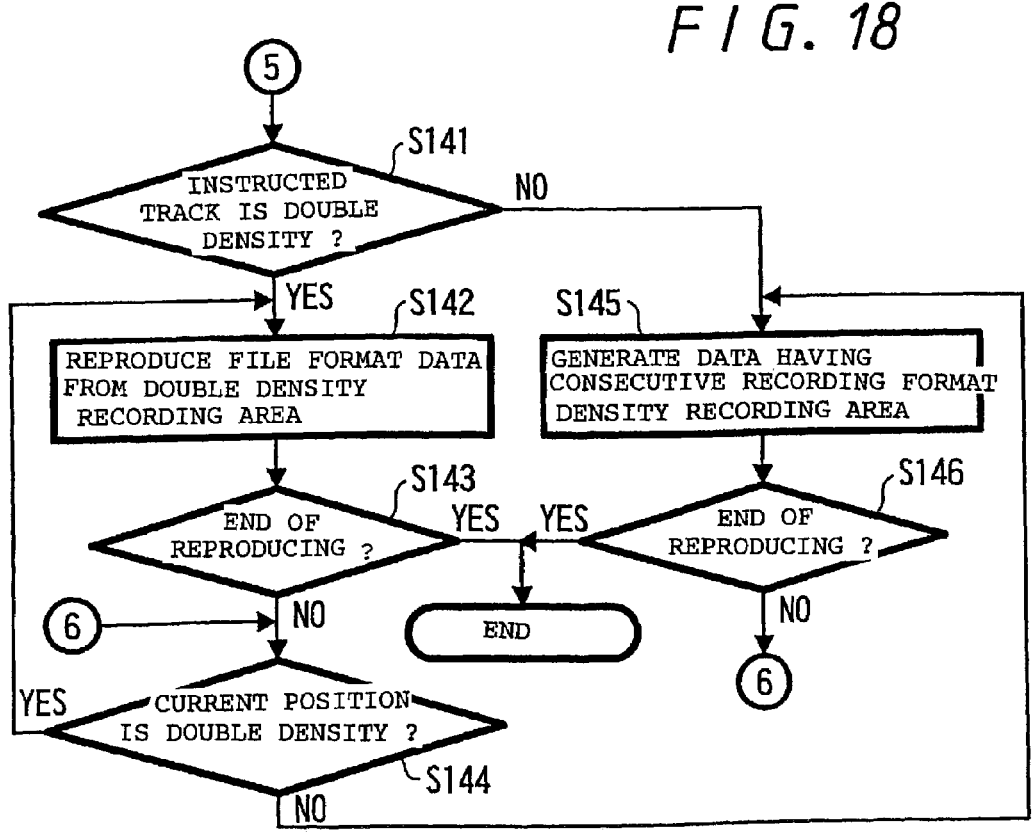
FIG. 18 is a continuation of the flowchart of FIG. 16.

When it is identified that the instruction of selecting is the instruction of selecting the track at step S121, it is performed to judge whether or not the instructed position of the track is within the double density recording area (step S141 of FIG. 18). If the position of the track within the double density recording area is selected, with respect to the data readout from the double density recording area, the audio PCM data corresponding to the file format are reproduced (step S142).

When the halt key is operated, it is performed to identify whether or not the end of reproducing is set (step S143). When it is detected that the end of reproducing is set, the operation of reproducing terminates. Further, when it is identified that the end of reproducing is not set at step S143, it is performed to judge whether or not the current reproducing position is within the double density recording area (step S144). If the current position is within the double density recording area, the step S142 is reprocessed, with respect to the data readout from the double density recording area, it is continued to reproduce the audio PCM data corresponding to the file format.

When it is identified that the current reproducing position is not within the double density recording area at step S144, a step S145 is executed. In addition, when it is identified that the current reproducing position is not within the double density recording area at step S141, the step S145 is also executed.

At this step S145, it is identified that the reproducing apparatus is within the single density recording area, and then, for the data readout from the single density recording area, the audio PCM data corresponding to the consecutive recording format are reproduced. When the halt key is operated, it is performed to identify whether or not the end of reproducing is set (step S146). When it is detected that the end of reproducing is set, the operation of reproducing terminates. When it is identified that the end of reproducing is not set at step S146, the step S144 is executed, and it is performed to identify whether or not the current reproducing position of is within the double density recording area. If the current position is within the single density recording area, it is continued to reproduce the audio PCM data corresponding to the consecutive recording format. If the current position is within the double density recording area, the step S142 is executed, and then, with respect to the readout data, it is performed to reproduce the audio PCM data corresponding to the file format.

In this way, in accordance with the data reproducing method of this embodiment, it is possible to handle two kinds of recording data having the consecutive recording format and the file format using the single density and the double density. The user can reproduce the audio data having the favorable recording format, and further it is very convenient to use since the user can reproduce the data without paying any attention to the recording density and the recording format.

In the aforementioned data reproducing method, it is explained to designate reproduction by the user's selecting and designating the recording density, and further it is also possible to select and designate the recording format in the same way as the aforementioned embodiment. In such a case, the designation of the consecutive recording format corresponds to the designation of the aforementioned single density, and the designation of the file format corresponds to the designation of the aforementioned double density.

At this point, in the aforementioned case, the double density recording area is explained as the case of the double density, and further it is also possible to use not only 2 times as much in density but also N (N>1) times as much in density.

[7] Third Embodiment of the Recording Medium

In terms of the recording density, the recording medium of the third embodiment is the same as the recording medium of the second embodiment. However, they differ in terms of the audio data which are recorded in the high density recording area. In this third embodiment, using the advantageous points of the high density recording area, it is performed to record the audio data in this high density recording area as are sampled using a high sampling frequency such as 88 kHz which are, for example, 2 times as much as in the case of CD.

In this case, for the recording density mixing type disc, in the same way as the aforementioned embodiment, any cases, in which the audio data having the same contents are recorded and/or different audio data are recorded, can be employed.

In accordance with the third embodiment, it is possible to record a lot of music in the disc since the audio data are of high quality and the data are recorded in the high recording density area even if the number of samples is large.

[Other Modified Embodiment]

At this point, in aforementioned respective embodiments, it is explained that the identification data having the recording format, the single density, and the double density are contained and recorded in TOC information, and further it may also be possible to perform recording in the read-in area or the readout area other than TOC information.

In the aforementioned embodiment, the audio data having the consecutive recording format are recorded on the side of the inner periphery and the audio data having the file format are recorded on the side of the outer periphery, and further it is also possible to for each side of the inner periphery and outer periphery to record the audio data having the opposite recording format.

It goes without saying that this invention can be applied not only to the disc medium, such as CD, only for reproducing but also to a magneto-optical disc medium. It is possible for this invention to be applied to a semiconductor memory as a recording medium.

As explained in the foregoing description, according to this invention, it is possible to handle both of the audio data having the consecutive recording format and the audio data having the file format by the same recording apparatus and the same reproducing apparatus, and thus, the invention is very conveniently used.

Further, it is possible to record and reproduce the audio data having the consecutive recording format and record and reproduce the audio data having the file format according to the user's selection, and thus, the invention is very conveniently used.

Further, since the audio data having the same contents using two kinds of recording formats can be recorded and reproduced mixedly in one recording medium, the invention becomes possible to record and reproduce the audio data according to the user's purpose of usage and thus,it becomes to be very conveniently used.

The invention claimed is:

1. A recording method comprising the steps of:
reading information on a table of contents from a recording medium;
identifying whether said recording medium is a recording medium in which two kinds of audio data consisting of audio data to be recorded in a first recording area and audio data having a file format to be recorded in a second recording area can be recorded based on readout information from said table of contents;
identifying whether said recording medium is a medium in which, when it is identified, said two kinds of audio data can be recorded; and
notifying whether said recording medium is defined as a recording medium for recording said two kinds of audio data when said recording medium is a medium in which no recording has yet been performed,
wherein said recording method records an identifier for indicating that two kinds of audio data as audio data recorded in said first recording area and audio data having a file format as recorded in said second recording area are recorded in said recording medium when it is decided that said recording medium is a recording medium for recording said two kinds of audio data.

2. The recording method as set forth in claim 1, wherein said recording method starts a process of recording when a recording start and a recording format are designated after it is decided that said recording medium records said two kinds of audio data.

3. The recording method as set forth in claim 2, wherein said method notifies that it is needed to designate said recording format when a process of said recording start is designated.

4. The recording method as set forth in claim 2, wherein said method selects said first recording area and said second recording area of said recording medium based on a designated recording format, and the audio data are recorded in said designated format on a selected recording area.

5. The recording method as set forth in claim 1, wherein said method performs a process of recording based on a recording format designated by said readout information from the table of contents when it is identified that said recording medium is a recording medium on which recording has not been performed.

6. The recording method as set forth in claim 1, wherein said method starts a process of recording when a recording format is designated and when it is decided that a recording medium is defined not to record said two kinds of audio data.

7. The recording method as set forth in claim 6, wherein said method notifies that said recording format is required when a process of said recording start is designated.

8. A recording method comprising the steps of:
reading information on a table of contents from a recording medium;
identifying whether said recording medium is a recording medium in which two kinds of audio data consisting of audio data to be recorded in a first recording area and audio data having a file format to be recorded in a second recording area can be recorded based on readout information from said table of contents;
identifying whether said recording medium is a medium in which, when it is identified, said two kinds of audio data can be recorded; and
notifying whether said recording medium is defined as a recording medium for recording said two kinds of audio data when said recording medium is a medium in which no recording has yet been performed,
wherein said recording method records an identifier for indicating that two kinds of audio data as audio data recorded in said first recording area and audio data having a file format as recorded in said second recording area are recorded in said recording medium when it is decided that said recording medium is a recording medium for recording said two kinds of audio data,
wherein said method performs a process of recording based on a recording format designated by said readout information from the table of contents when it is identified that said recording medium is a recording medium on which recording has not been performed, and
wherein said method gives a warning when a recording format different from the recording format designated by said readout information from the table of contents is designated.

* * * * *